(12) United States Patent
Yeom et al.

(10) Patent No.: US 11,353,970 B2
(45) Date of Patent: Jun. 7, 2022

(54) ELECTRONIC PEN SENSING APPARATUS AND ELECTRONIC DEVICE INCLUDING THE SAME

(71) Applicant: LG ELECTRONICS INC., Seoul (KR)

(72) Inventors: Dongwoo Yeom, Seoul (KR); Manho Lee, Seoul (KR); Younghwan Kim, Seoul (KR); Jihye Ahn, Seoul (KR); Dalkwon Koh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/079,307

(22) Filed: Oct. 23, 2020

(65) Prior Publication Data

US 2021/0124439 A1 Apr. 29, 2021

(30) Foreign Application Priority Data

Oct. 25, 2019 (WO) ................ PCT/KR2019/014221

(51) Int. Cl.
*G06F 3/03* (2006.01)
*G06F 3/0354* (2013.01)
*G06F 3/046* (2006.01)
*G06F 3/038* (2013.01)
*G06F 3/041* (2006.01)

(52) U.S. Cl.
CPC ........ *G06F 3/03545* (2013.01); *G06F 3/0383* (2013.01); *G06F 3/046* (2013.01); *G06F 3/04162* (2019.05)

(58) Field of Classification Search
CPC ............ G06F 3/03545; G06F 3/04162; G06F 3/0383; G06F 3/046; G06F 3/0441; G06F 3/0442; G06F 2203/04106; G06F 2203/04114
See application file for complete search history.

(56) References Cited

U.S. PATENT DOCUMENTS

| 2006/0279548 | A1* | 12/2006 | Geaghan | G06F 3/03545 345/173 |
|---|---|---|---|---|
| 2017/0300736 | A1* | 10/2017 | Song | G06K 9/0004 |
| 2017/0344787 | A1* | 11/2017 | Cho | G06F 3/0443 |

* cited by examiner

*Primary Examiner* — Lisa S Landis
(74) *Attorney, Agent, or Firm* — Lee Hong Degerman Kang & Waimey

(57) ABSTRACT

Disclosed is an electronic pen sensing apparatus including an electronic pen sensor disposed at the upper part or the lower part of a display, a heterogeneous sensor disposed at the lower part of the display, a processor electrically connected to the electronic pen sensor, the processor being configured to output a driving signal to the electronic pen sensor, to calculate coordinate information of the electronic pen based on a sensing signal sensed by the electronic pen sensor, wherein the electronic pen sensor is not disposed in a first area corresponding to the heterogeneous sensor, and the processor calculates first coordinate information of the electronic pen based on a first sensing signal sensed by the electronic pen sensor in the case in which the electronic pen is located in a second area.

19 Claims, 39 Drawing Sheets

(a)

(b)

ELECTRONIC PEN SENSING APPARATUS AND ELECTRONIC DEVICE INCLUDING THE SAME

CROSS-REFERENCE TO RELATED APPLICATION

Pursuant to 35 U.S.C. § 119 (a), this application claims the benefit of an earlier filing date and right of priority to International Application No. PCT/KR2019/014221 filed on Oct. 25, 2019, the contents of which are hereby incorporated by reference herein in its entirety.

BACKGROUND OF THE INVENTION

1. Field of the Invention

The present disclosure relates to an electronic pen sensing apparatus and an electronic device including the same, and more particularly to an electronic pen sensing apparatus capable of calculating coordinate information of an electronic pen even in a heterogeneous sensor area in which no electronic pen sensor is disposed and an electronic device including the same.

2. Description of the Related Art

An electronic pen is an apparatus used to input text or an image corresponding to motion of the electronic pen when writing is performed on a display of an electronic device.

The electronic pen may be classified as a pressure-sensitive type electronic pen, a capacitive type electronic pen, an electromagnetic resonance (EMR) type electronic pen, which requires no separate power supply, or an active electrostatic solution (AES) type electronic pen, which uses an internal power supply.

Korean Patent Application Publication No. 10-2018-0011730 (hereinafter referred to as a "prior art document") discloses an electromagnetic resonance type electronic pen.

In the case in which the electronic pen disclosed in the prior art document is used, it is necessary to provide an electronic pen sensor, which is configured to sense the electronic pen, around a display of a mobile terminal.

Meanwhile, in recent years, a fingerprint recognition sensor has been attached to a display in order to perform fingerprint recognition.

Therefore, there is a need for technology capable of embodying an electronic pen sensor and a fingerprint recognition sensor together.

In particular, there is a need for technology capable of sensing coordinate information of an electronic pen in a fingerprint recognition sensor area.

SUMMARY OF THE INVENTION

An object of the present disclosure is to provide an electronic pen sensing apparatus capable of calculating coordinate information of an electronic pen even in a heterogeneous sensor area in which no electronic pen sensor is disposed and an electronic device including the same.

Another object of the present disclosure is to provide an electronic pen sensing apparatus capable of embodying an electronic pen sensor and at least one heterogeneous sensor together and an electronic device including the same.

In accordance with an aspect of the present disclosure, the above and other objects can be accomplished by the provision of an electronic pen sensing apparatus including an electronic pen sensor disposed at the upper part or the lower part of a display, a heterogeneous sensor disposed at the lower part of the display, a processor electrically connected to the electronic pen sensor, the processor being configured to output a driving signal to the electronic pen sensor, to calculate coordinate information of the electronic pen based on a sensing signal sensed by the electronic pen sensor, wherein the electronic pen sensor is not disposed in a first area corresponding to the heterogeneous sensor, and the processor is configured to calculate first coordinate information of the electronic pen based on a first sensing signal sensed by the electronic pen sensor in the case in which the electronic pen is located in a second area and to calculate second coordinate information of the electronic pen based on a compensation signal obtained by compensating for the first sensing signal in the case in which the electronic pen moves from the second area to the first area or the vicinity of the first area, and an electronic device including the same.

The electronic pen sensor may include a plurality of first channel sensors disposed to extend in a first direction and a plurality of second channel sensors disposed to extend in a second direction intersecting the first direction, and the first channel sensors and the second channel sensors may not be disposed in the first area corresponding to the heterogeneous sensor.

In the case in which the electronic pen moves from the second area to the first area or the vicinity of the first area, the processor may compensate for sensing signals sensed by at least some of the plurality of first channel sensors or at least some of the plurality of second channel sensors, and may calculate second coordinate information of the electronic pen based on the compensation signals.

The processor may compensate for the sensing signals sensed by at least some of the plurality of first channel sensors using the average of levels of a plurality of sensing signals.

The processor may perform setting such that sensing signals nearer the first area have higher weights and may then compensate for the sensing signals sensed by the at least some of the plurality of first channel sensors.

The plurality of first channel sensors may be disposed to overlap each other, and the plurality of second channel sensors may be disposed to overlap each other.

The plurality of first channel sensors may be symmetric with respect to the first area.

The plurality of second channel sensors may be symmetric with respect to the first area.

The processor may be configured to output a driving signal having a first driving frequency in the case in which the electronic pen is located at a position farther than a first distance and to output a driving signal having a second driving frequency higher than the first driving frequency in the case in which the electronic pen is located between the first distance and a second distance.

The processor may be configured to output a driving signal having a third driving frequency higher than the second driving frequency in the case in which the electronic pen is located within a third distance nearer than the second distance.

The processor may be configured to perform first direction sensing and second direction sensing according to first direction driving in the case in which the electronic pen is located between the second distance and the third distance and to perform first direction sensing and second direction sensing according to second direction driving in the case in which the electronic pen is located within the third distance.

The processor may be configured to output a driving signal having a first driving frequency and to output a driving signal having a second driving frequency higher than the first driving frequency in the case in which the level of the sensing signal sensed by the electronic pen sensor is between a first reference value and a second reference value.

The processor may be configured to output a driving signal having a third driving frequency higher than the second driving frequency in the case in which the level of the sensing signal sensed by the electronic pen sensor while outputting the driving signal having the second driving frequency is equal to or greater than a third reference value higher than the second reference value.

The processor may be configured to perform first direction sensing and second direction sensing according to first direction driving in the case in which the level of the sensing signal sensed by the electronic pen sensor is between the second reference value and the third reference value and to perform first direction sensing and second direction sensing according to second direction driving in the case in which the level of the sensing signal sensed by the electronic pen sensor is equal to or greater than the third reference value.

A through hole may be formed in a portion of an area in which the electronic pen sensor is disposed, and the heterogeneous sensor may be disposed in the through hole.

The electronic pen sensor may be disposed at the lower part of the display, a shielding sheet may be disposed at the lower part of the electronic pen sensor, and the heterogeneous sensor may be formed to protrude in a direction toward the shielding sheet.

The electronic pen sensor may be disposed at the lower part of the display, a shielding sheet may be disposed at the lower part of the electronic pen sensor, and the heterogeneous sensor may be formed to protrude in a direction toward the display.

The electronic pen sensing apparatus may further include a second heterogeneous sensor disposed at the lower part of the display, wherein the electronic pen sensor may not be disposed in a third area corresponding to the second heterogeneous sensor.

The processor may be configured to calculate third coordinate information of the electronic pen based on a second sensing signal sensed by the electronic pen sensor in the case in which the electronic pen is located in a fourth area and to calculate fourth coordinate information of the electronic pen based on a compensation signal obtained by compensating for the second sensing signal in the case in which the electronic pen moves from the fourth area to the third area or the vicinity of the third area.

In accordance with another aspect of the present disclosure, there are provided an electronic pen sensing apparatus including an electronic pen sensor disposed at the upper part or the lower part of a display, a heterogeneous sensor disposed at the lower part of the display, a second heterogeneous sensor disposed at the lower part of the display, a processor electrically connected to the electronic pen sensor, the processor being configured to output a driving signal to the electronic pen sensor, to calculate coordinate information of the electronic pen based on a sensing signal sensed by the electronic pen sensor, wherein the electronic pen sensor is not disposed in a first area corresponding to the heterogeneous sensor, and the electronic pen sensor is not disposed in a third area corresponding to the second heterogeneous sensor, and an electronic device including the same.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve different meanings. Accordingly, the suffixes "module" and "unit" may be used interchangeably.

Figure 1:
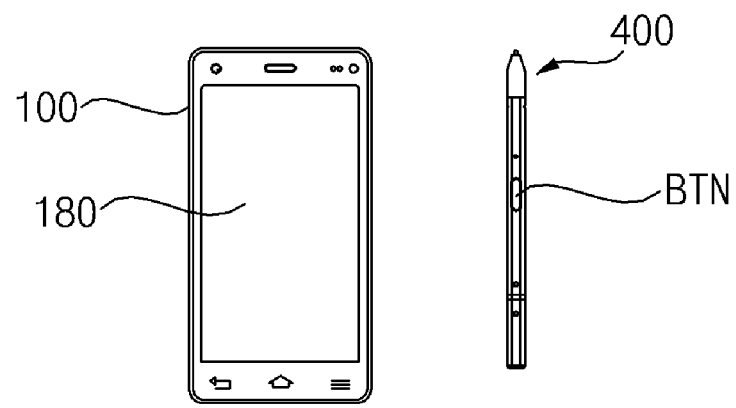
FIG. 1 is a view showing an electronic pen system according to an embodiment of the present disclosure.

FIG. 1 is a view showing an electronic pen system according to an embodiment of the present disclosure.

Referring to FIG. 1, the electronic pen system 10 may include an electronic pen 400 and an electronic device 100 including a display 180.

The electronic pen 400 may be embodied in any of various types, such as an electromagnetic resonance type, an active type, and an optical type.

Meanwhile, the electronic device 100 includes an electronic pen sensor 148 (see FIG. 7) configured to recognize the electronic pen 400.

Meanwhile, the electronic device 100 further includes a heterogeneous sensor 149 (see FIG. 7), such as a fingerprint sensor or a camera sensor.

In the present disclosure, the electronic pen sensor 148 (see FIG. 7) and the heterogeneous sensor 149 (see FIG. 7) are provided at the lower part of the display 180 of the electronic device 100.

In the case in which the electronic pen sensor 148 (see FIG. 7) and the heterogeneous sensor 149 (see FIG. 7) are provided at the lower part of the display 180, it is preferable for the electronic pen sensor 148 not to be disposed in a first area, in which the heterogeneous sensor 149 is disposed, such that the heterogeneous sensor 149 can be operated.

Meanwhile, when the electronic pen 400 moves to a position corresponding to the first area, the electronic pen sensor 148 (see FIG. 7) cannot sense a sensing signal in the first area, since the electronic pen sensor 148 is not disposed in the first area.

In the present disclosure, when the electronic pen sensor 148 (see FIG. 7) cannot sense a sensing signal in the first area, a previous sensing signal is compensated for in order to calculate coordinate information in the first area or near the first area. Consequently, it is possible to calculate coordinate information of the electronic pen even in a heterogeneous sensor area in which no electronic pen sensor is disposed. As a result, the electronic pen sensor and the heterogeneous sensor may be embodied together.

Meanwhile, examples of the electronic device 100 may include a mobile terminal, a tablet, a laptop computer, a TV, a monitor, and a vehicle display. Hereinafter, the mobile terminal will be described as an example of the electronic device 100.

Figure 2:
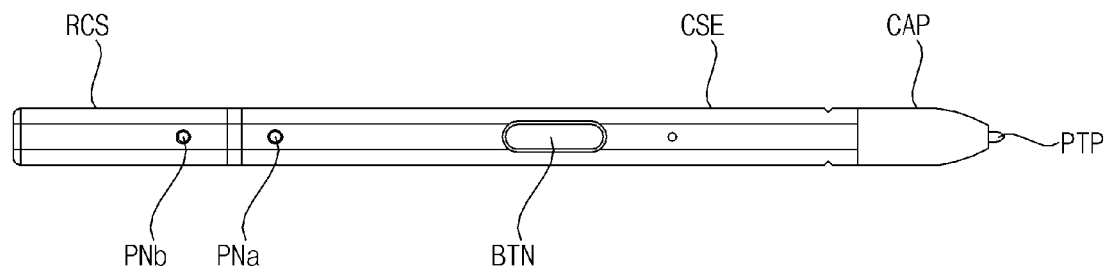
FIG. 2 is a view showing an electronic pen according to an embodiment of the present disclosure.

FIG. 2 is a view showing an electronic pen according to an embodiment of the present disclosure.

Referring to the figure, the electronic pen 400 according to the embodiment of the present disclosure may include a case CSE having a hollow portion formed in one end thereof, a pen tip PTP disposed at one end of the case CSE through the hollow portion, one end of the pen tip PTP being exposed outside, a cap CAP disposed to surround the other end of the pen tip PTP, and a second case RCS coupled to the other end of the case CSE. As a result, the electronic pen 400 has an external appearance shown in the figure.

Meanwhile, a user manipulation button BTN may be formed on one surface of the case CSE.

In the case in which the electronic pen 400 according to the embodiment of the present disclosure is an electromagnetic resonance type electronic pen or an active type electronic pen, the electronic pen 400 may sense an electromagnetic field generated in an electronic pen sensing apparatus UD in the electronic device 100 using a core CRE, a coil COL, and a capacitor CAT in the electronic pen 400, and may output an electromagnetic signal having a frequency or level varied based on a sensing signal to the outside.

Consequently, the electronic pen sensing apparatus UD in the electronic device 100 may calculate coordinate information of the electronic pen 400 based on the electromagnetic signal having the varied frequency or level.

For example, when the button BTN is manipulated and the pen tip PTP of the electronic pen 400 approaches the display 180 of the electronic device 100, the electronic pen 400 may sense an electromagnetic field generated in the electronic pen sensing apparatus UD in the electronic device 100, and may output an electromagnetic signal having a frequency or level varied based on a sensing signal to the outside.

Meanwhile, the case CSE and the second case RCS may be coupled to each other via a coupling member CNP. In particular, a first pin PNa may be coupled to an opening formed in the case CSE, and a second pin PNb may be coupled to an opening formed in the coupling member CNP.

In the case in which the electronic pen 400 according to the embodiment of the present disclosure is an optical type electronic pen, the electronic pen 400 may further include an optical output module 458 disposed in the case CSE, the optical output module 458 being configured to output light through the pen tip PTP, and an optical sensor 448 disposed in the case CSE, the optical sensor 448 being configured to sense reception light corresponding to the light output from the optical output module 458 through the pen tip PTP.

In order to execute a pointing mode, the electronic pen 400 according to the embodiment of the present disclosure includes an inertia sensor module IMU disposed in the case CSE, the inertia sensor module IMU being configured to sense motion of the electronic pen, an input button BTN disposed on the case CSE, a pressure sensor TSS configured to sense pressure of the input button BTN, and a communicator 420 disposed in the case CSE, the communicator 420 being configured to exchange data with an external electronic device. Consequently, it is possible to calculate coordinate information of the electronic pen even in the heterogeneous sensor area in which no electronic pen sensor is disposed. In particular, writing is possible in a pen mode even in an area deviating from the display 180.

Figure 3:
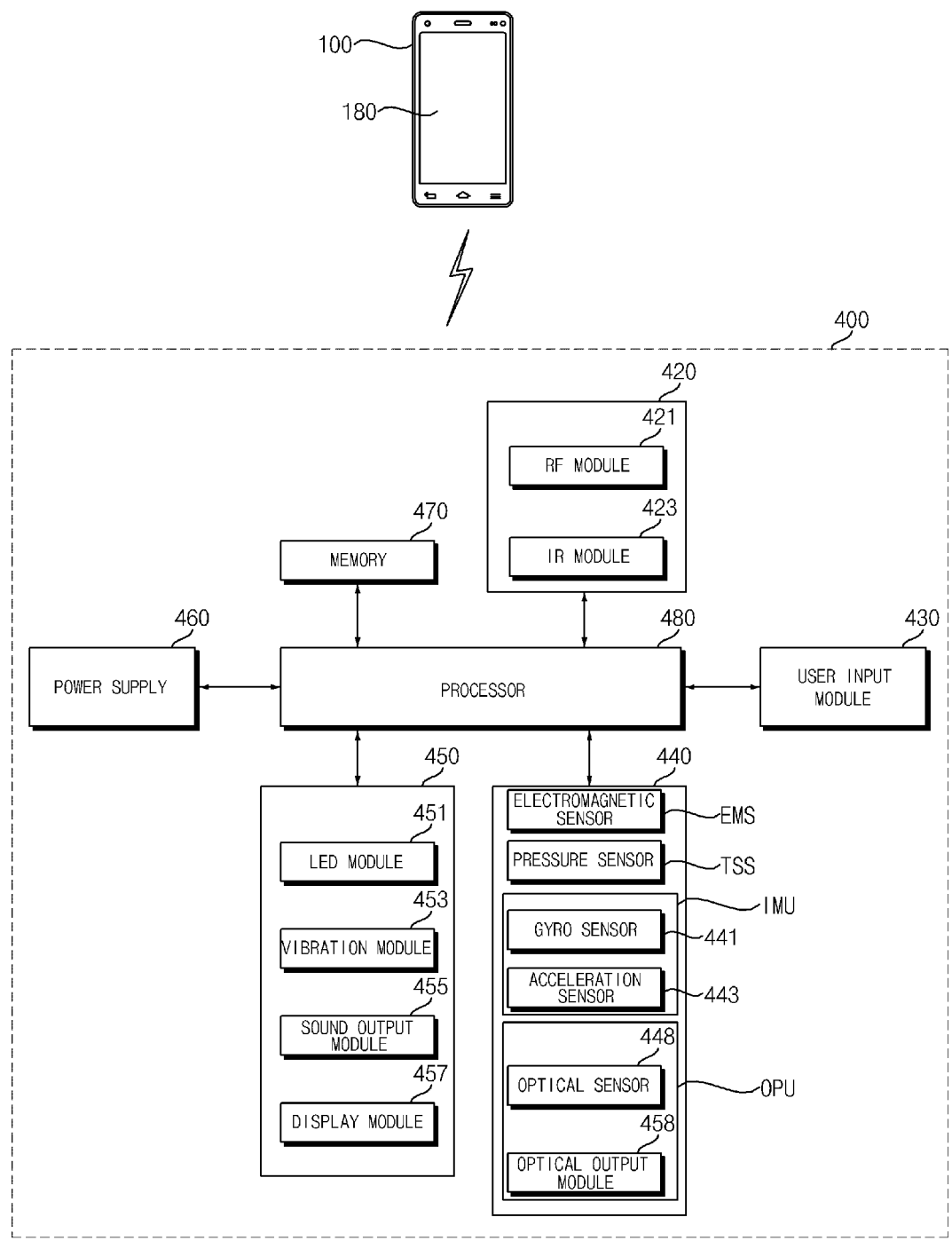
FIG. 3 is an internal block diagram of the electronic pen of FIG. 2.

FIG. 3 is an internal block diagram of the electronic pen of FIG. 2.

Referring to FIG. 3, the electronic pen 400 may include a wireless communicator 420, a user input module 430, a sensor unit 440, an output module 450, a power supply 460, a memory 470, and a processor 480.

The wireless communicator 420 may pair with the electronic device 100, and may exchange data with the paired device.

In particular, the wireless communicator 420 may transmit coordinate information to the electronic device 100.

Meanwhile, the wireless communicator 420 may include an RF module 421 configured to transmit and receive a signal to and from the electronic device 100 according to RF communication standards.

Meanwhile, the wireless communicator 420 may include an IR module 423 configured to transmit and receive a signal to and from the electronic device 100 according to IR communication standards.

In the pointing mode, the wireless communicator 420 transmits information about motion of the electronic pen 400 to the electronic device 100 via the RF module 421.

In the pen mode, the wireless communicator 420 transmits coordinate information calculated according to the operation of the optical output module 458 and the optical sensor 448 to the electronic device 100 via the RF module 421.

Meanwhile, the wireless communicator 420 may receive a signal transmitted by the electronic device 100 via the RF module 421.

Meanwhile, the wireless communicator 420 may transmit a command for power on/off, channel change, or volume change to the electronic device 100 via the IR module 423, as needed.

The user input module 430 may include a keypad, a button, a touchpad, or a touchscreen.

A user may manipulate the user input module 430 to input a command related to the electronic pen 400.

For example, in the case in which the user input module 430 includes a hard key button, the user may input a command related to the electronic pen 400 by pushing the hard key button.

The sensor unit 440 may include an electromagnetic sensor EMS, an inertia sensor module IMU, an optical module OPU, and a pressure sensor TSS.

The electromagnetic sensor EMS may sense an electromagnetic field therearound.

In particular, the electromagnetic sensor EMS may sense an electromagnetic field generated in the electronic pen sensing apparatus UD in the electronic device 100 using the core CRE, the coil COL, and the capacitor CAT in the electronic pen 400, and may output an electromagnetic signal having a frequency or level varied based on a sensing signal to the outside.

Consequently, the electronic pen sensing apparatus UD in the electronic device 100 may calculate coordinate information of the electronic pen 400 based on the electromagnetic signal having the varied frequency or level.

The inertia sensor module IMU may be disposed in the case CSE, and may sense motion of the electronic pen 400. To this end, the inertia sensor module IMU may include a gyro sensor 441 or an acceleration sensor 443.

The gyro sensor 441 may sense information about motion of the electronic pen 400. As an example, the gyro sensor

441 may sense information about motion of the electronic pen 400 based on x, y, and z axes.

The acceleration sensor 443 may sense information about movement speed of the electronic pen 400.

The optical module OPU may include an optical output module 458 disposed in the case CSE, the optical output module 458 being configured to output light through the pen tip PTP, and an optical sensor 448 disposed in the case CSE, the optical sensor 448 being configured to sense reception light corresponding to the light output from the optical output module 458 through the pen tip PTP.

The pressure sensor TSS may be disposed at the lower part of the input button BTN disposed on the case CSE, and may sense pressure of the input button BTN.

For example, the level or duty of a signal sensed by the pressure sensor TSS may be varied depending on force of the input button BTN.

The output module 450 may output an image or voice signal corresponding to manipulation of the user input module 430 or to a signal transmitted from the electronic device 100. The user may recognize whether the user input module 430 has been manipulated or whether the electronic device 100 has been controlled through the output module 450.

As an example, the output module 450 may include an LED module 451 configured to be turned on, a vibration module 453 configured to generate vibration, a sound output module 455 configured to output a sound, or a display module 457 configured to output an image, when the user input module 430 is manipulated or when a signal is transmitted to or received from the electronic device 100 via the wireless communicator 420.

The power supply 460 supplies power to the interior of the electronic pen 400.

When the power supply 460 does not move for a predetermined time, the power supply 460 interrupts the supply of power, whereby power consumption may be reduced.

Meanwhile, when a predetermined key provided in the electronic pen 400 is manipulated, the power supply 460 may resume the supply of power.

The memory 470 may store various kinds of programs and application data necessary to control or operate the electronic pen 400.

For example, when the electronic pen 400 pairs with the electronic device 100 and wirelessly transmits and receives a signal to and from the electronic device 100 via the RF module 421, the electronic pen 400 transmits and receives a signal to and from the electronic device 100 through a predetermined frequency band.

Meanwhile, the processor 480 may store information about a frequency band within which the electronic pen 400 wirelessly transmits and receives a signal to and from the paired electronic device 100 in the memory 470, and may refer to the stored information.

The processor 480 controls overall operation of the electronic pen 400.

The processor 480 may transmit a signal corresponding to predetermined key manipulation of the user input module 430 or coordinate information or motion information sensed by the sensor unit 440 to the paired electronic device 100 via the wireless communicator 420.

A user input interface (not shown) of the electronic device 100 may include a wireless communicator (not shown) configured to wirelessly transmit and receive a signal to and from the electronic pen 400 and a coordinate value calculation unit (not shown) configured to calculate the coordinate value of a pointer corresponding to the operation of the electronic pen 400.

The user input interface (not shown) may wirelessly transmit and receive a signal to and from the electronic pen 400 via an RF module (not shown). In addition, the user input interface (not shown) may receive a signal transmitted by the electronic pen 400 according to IR communication standards via an IR module (not shown).

Meanwhile, the coordinate value calculation unit (not shown) may correct a hand tremor or an error from a received signal corresponding to the operation of the electronic pen 400 to calculate the coordinate value (x, y) of the pointer 205 to be displayed on the display 180.

The signal from the electronic pen 400 input to the electronic device 100 via the user input interface (not shown) is transmitted to a signal processing unit (not shown) of the electronic device 100. The signal processing unit (not shown) may distinguish information about the operation of the electronic pen 400 and key manipulation from the signal transmitted from the electronic pen 400, and may control the electronic device 100 correspondingly.

As another example, the electronic pen 400 may calculate the coordinate value of the pointer corresponding to the operation, and may output the calculated coordinate value of the pointer to the user input interface (not shown) of the electronic device 100. In this case, the user input interface (not shown) of the electronic device 100 may transmit information about the received coordinate value of the pointer to the signal processing unit (not shown) without separate hand tremor or error correction.

In addition, as another example, the coordinate value calculation unit (not shown) may be provided in the signal processing unit (not shown), rather than in the user input interface (not shown), unlike the figure.

Figure 4:
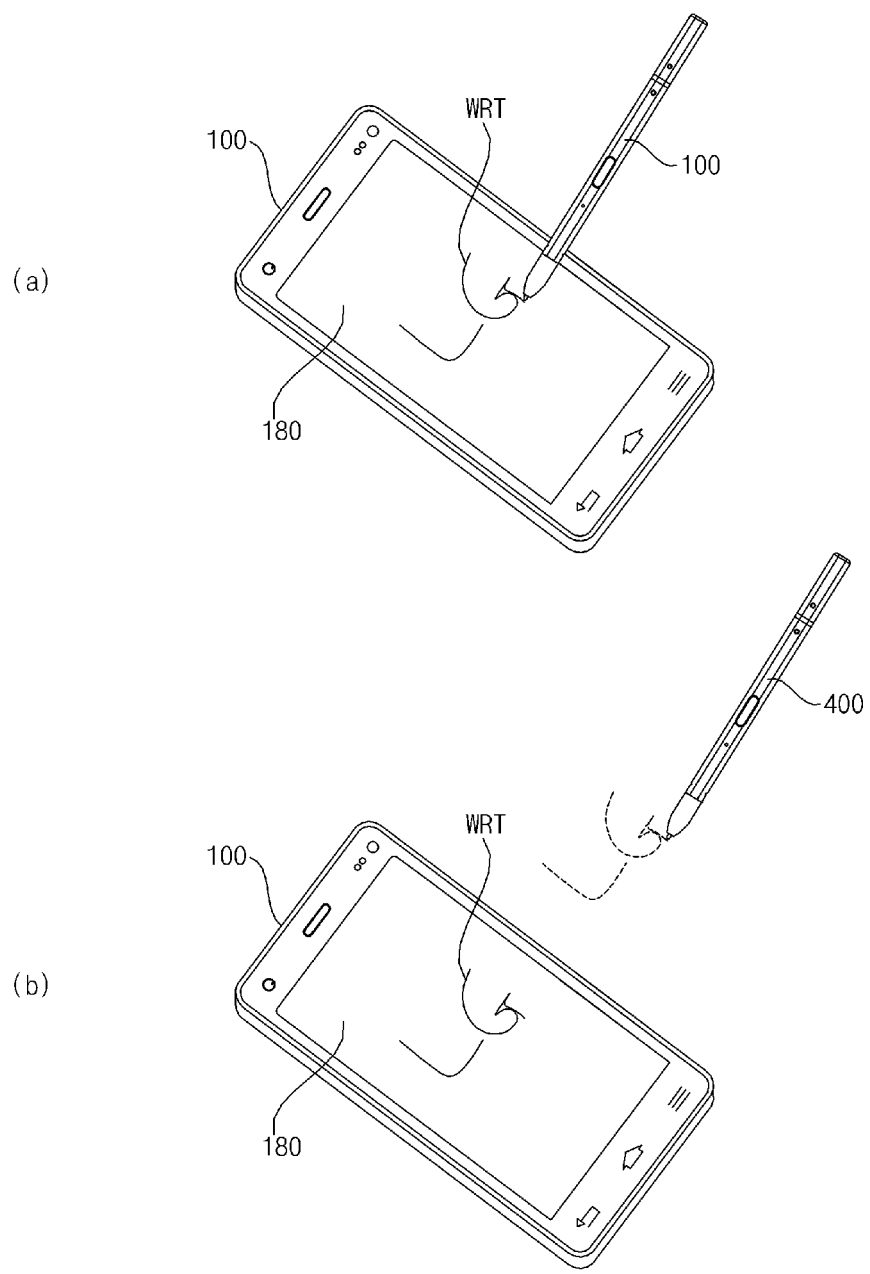
FIG. 4 is a view showing a pen mode operation method of the electronic pen of FIG. 2.

FIG. 4 is a view showing a pen mode operation method of the electronic pen of FIG. 2.

Referring to the figure, at the time of the pen mode operation, the electromagnetic sensor EMS of the electronic pen 400 may sense an electromagnetic field generated in the electronic pen sensing apparatus UD in the electronic device 100 using the core CRE, the coil COL, and the capacitor CAT in the electronic pen 400, and may output an electromagnetic signal having a frequency or level varied based on a sensing signal to the outside.

Consequently, the electronic pen sensing apparatus UD in the electronic device 100 may calculate coordinate information of the electronic pen 400 based on the electromagnetic signal having the varied frequency or level.

As a result, written text, such as "LG", is displayed on the display 180 of the electronic device 100, as shown in FIG. 4(*a*).

Meanwhile, at the time of the pen mode operation, the optical sensor 448 of the electronic pen 400 may also be operated. The optical sensor 448 of the electronic pen 400 senses reception light corresponding to the light output from the output module 458.

The processor 480 may calculate coordinate information based on continuously received reception light, and may be configured to transmit the calculated coordinate information to the paired electronic device 100.

Consequently, the communicator 425 may transmit the coordinate information based on the writing mode to the paired electronic device 100 via the RF module 421.

Meanwhile, even in the case in which the electronic pen 400 deviates from the display 180 of the electronic device

100, as shown in FIG. 4(*b*), the optical sensor 448 senses reception light corresponding to the light output from the output module 458.

The processor 480 may calculate coordinate information based on continuously received reception light, and may be configured to transmit the calculated coordinate information to the paired electronic device 100.

As a result, written text, such as "LG", is displayed on the display 180 of the electronic device 100, as shown in FIG. 4(*b*).

Figure 5:
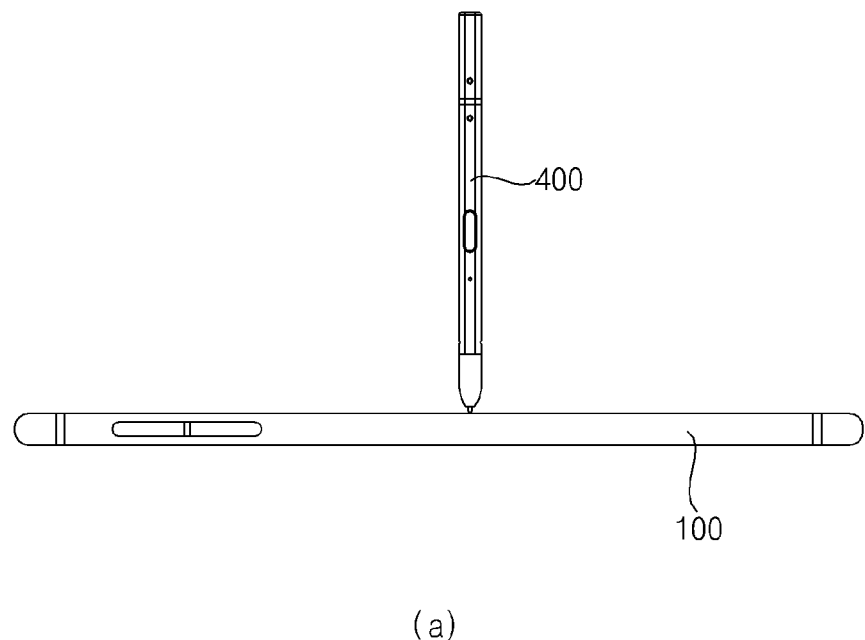
FIG. 5 is a reference view illustrating a pen mode and a pointing mode of the electronic pen of FIG. 2.
Figure 5:
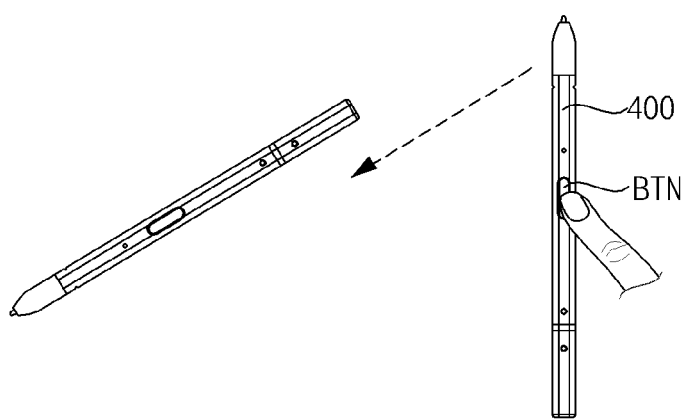

FIG. 5 is a reference view illustrating the pen mode and the pointing mode of the electronic pen of FIG. 2.

First, FIG. 5(*a*) shows a pen mode operation of the electronic pen 400.

Referring to the figure, when writing is performed on the display 180 of the electronic device 100 according to the pen mode operation of the electronic pen 400, the electromagnetic sensor EMS of the electronic pen 400 may sense an electromagnetic field generated in the electronic pen sensing apparatus UD in the electronic device 100 using the core CRE, the coil COL, and the capacitor CAT in the electronic pen 400, and may output an electromagnetic signal having a frequency or level varied based on a sensing signal to the outside.

Consequently, the electronic pen sensing apparatus UD in the electronic device 100 may calculate coordinate information of the electronic pen 400 based on the electromagnetic signal having the varied frequency or level.

As a result, text or a picture corresponding to writing based on motion of the electronic pen 400 is displayed on the display 180 of the electronic device 100.

Meanwhile, when writing is performed on a floor in the state in which the electronic pen 400 deviates from the display 180 of the electronic device 100, the communicator 420 of the electronic pen 400 may transmit coordinate information calculated according to the operation of the optical output module 458 and the optical sensor 448 to the outside in the pen mode.

As a result, text or a picture corresponding to writing based on motion of the electronic pen 400 is displayed on the display 180 of the electronic device 100.

Meanwhile, in the case in which the communicator 420 is not paired with the electronic device 100 at the time of the pen mode operation, the communicator 420 may pair with the electronic device 100. As a result, writing according to the pen mode operation is performed on the electronic device 100.

Meanwhile, in the case in which the communicator 420 is not paired with the electronic device 100 at the time of the pen mode operation, the communicator 420 may transmit a pairing request signal to the electronic device 100, and may receive a pairing response signal from the electronic device 100. As a result, writing according to the pen mode operation is performed on the electronic device 100.

Meanwhile, the inertia sensor module IMU may continuously sense motion information during the pen mode operation. Consequently, switching between the pen mode and the pointing mode is possible.

FIG. 5(*b*) shows a pointing mode operation of the electronic pen 400.

Referring to the figure, when the electronic pen 400 is lifted and the input button BTN is pushed during the pen mode operation of the electronic pen 400, switching to the pointing mode may be performed.

When the electronic pen 400 is moved according to the pointing mode operation of the electronic pen 400, the communicator 420 of the electronic pen 400 may transmit coordinate information calculated by the inertia sensor module IMU to the outside in the pointing mode.

Meanwhile, in the case in which the communicator 420 is not paired with the electronic device 100 at the time of the pointing mode operation, the communicator 420 may pair with the electronic device 100. As a result, pointing according to the pointing mode operation is performed on the electronic device 100.

Meanwhile, in the case in which the communicator 420 is not paired with the electronic device 100 at the time of the pointing mode operation, the communicator 420 may transmit a pairing request signal to the electronic device 100, and may receive a pairing response signal from the electronic device 100. As a result, pointing according to the pointing mode operation is performed on the electronic device 100.

Meanwhile, in the case in which there is no motion sensed by the inertia sensor module IMU during the pointing mode operation or the pen mode operation, the electronic pen 400 according to the embodiment of the present disclosure may be operated in a standby mode. As a result, power consumption may be reduced.

Meanwhile, in the case in which the input button BTN is pushed during the pointing mode operation, the communicator 420 may transmit motion information sensed by the inertia sensor module IMU and operation information of the input button BTN to the outside. As a result, a drag operation in the pointing mode is possible.

Meanwhile, in the case in which there is a signal sensed by the pressure sensor TSS during the pointing mode operation, the communicator 420 may transmit motion information sensed by the inertia sensor module IMU and sensing information of the pressure sensor TSS to the outside. As a result, zoom in/out or depth change in the pointing mode is possible.

Meanwhile, the communicator 420 may transmit level information of a signal sensed by the pressure sensor TSS to the outside together with motion information. As a result, zoom in/out or depth change in the pointing mode is possible.

Meanwhile, unlike FIG. 5(*b*), the electronic pen 400 may be operated in the pen mode when the level of the optical signal sensed by the optical sensor 448 is equal to or greater than a reference value or in the pointing mode when the level of the optical signal sensed by the optical sensor 448 is less than the reference value. Consequently, switching between the pen mode and the pointing mode is possible.

Meanwhile, the electronic pen 400 may be operated in the pen mode according to a first operation of the input button BTN.

Next, the electronic pen 400 may be operated in the pointing mode according to a second operation of the input button BTN. Consequently, switching between the pen mode and the pointing mode is possible.

The first operation of the input button BTN and the second operation of the input button BTN may be identical operations. For example, mode switching may be performed by toggling.

Figure 6A:
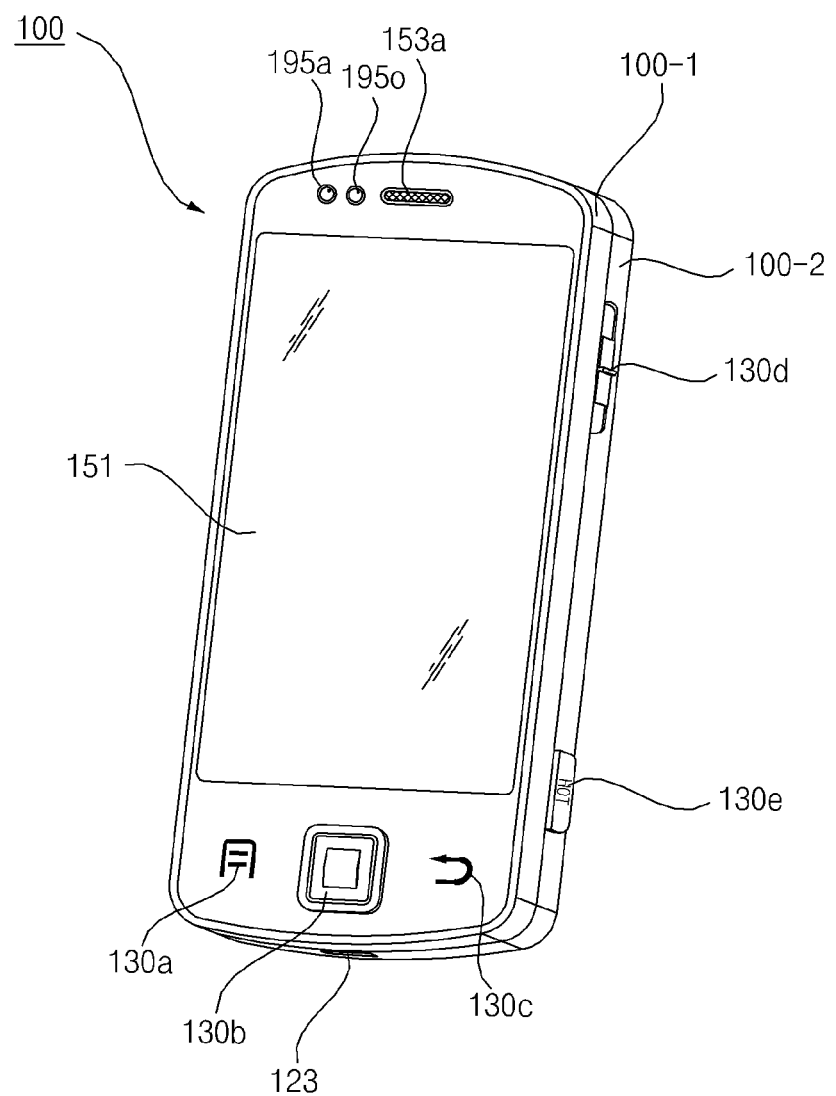
FIG. 6A is a front perspective view of a mobile terminal as an example of an electronic device according to an embodiment of the present disclosure.
Figure 6B:
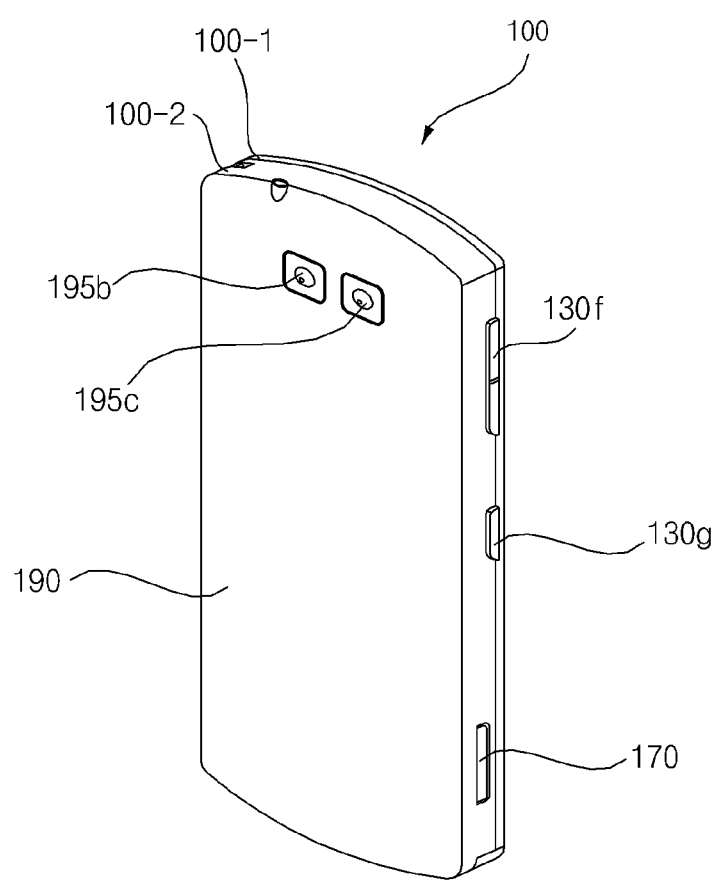
FIG. 6B is a rear perspective view of the mobile terminal shown in FIG. 6A.

FIG. 6A is a front perspective view of a mobile terminal as an example of an electronic device according to an embodiment of the present disclosure, and FIG. 6B is a rear perspective view of the mobile terminal shown in FIG. 6A

Referring to FIG. 6A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153*a*, a first camera 195*a*, a second camera 195*o*, and a first to third user input modules 130*a*, 130*b*, and 130*c* may be disposed in the front case 100-1. Further, a fourth user input module 130*d*, a fifth user input module 130*e*, and a microphone 123 may be disposed on a lateral surface of the rear case 100-2.

In the display 180, a touchpad may be overlapped in a layer structure so that the display 180 may operate as a touch screen.

The first sound output module 153*a* may be implemented in the form of a receiver or a speaker. The first camera 195*a* may be implemented in a form suitable for photographing an image or a moving image of a user, and the like. The microphone 123 may be implemented in a form suitable for receiving a user's voice, other sounds, and the like.

The first to fifth user input modules 130*a*, 130*b*, 130*c*, 130*d* and 130*e* and a sixth and seventh user input modules 130*f* and 130*g* described below may be collectively referred to as a user input module 130.

The microphone 123 may be disposed in the lower side of the rear case 100-2, i.e., in the lower side of the mobile terminal 100, to collect an audio signal. Otherwise the microphone 123 may be disposed in the upper side of the rear case 100-2, i.e., in the upper side of the mobile terminal 100, to collect an audio signal.

Referring to FIG. 6B, a third camera 195*b*, a fourth camera 195*c*, and a fourth microphone (not shown) may be additionally mounted on the rear surface of the rear case 100-2, and a sixth and seventh user input modules 130*f* and 130*g*, and an interface 175 may be disposed on the lateral surface of the rear case 100-2.

The third camera 195*b* has a photographing direction substantially opposite to that of the first camera 195*a*, and may have different pixels from the first camera 195*a*. A flash (not shown) and a mirror (not shown) may be additionally disposed adjacent to the third camera 195*b*. In addition, another camera may be installed adjacent to the third camera 195*b* to be used for shooting a three-dimensional stereoscopic image.

A second sound output module (not shown) may be additionally disposed in the rear case 100-2. The second sound output module may implement a stereo function together with the first sound output module 153*a*, and may be used for talking in a speakerphone mode.

A power supply 190 for supplying power to the mobile terminal 100 may be mounted in the rear case 100-2. The power supply 190 may be, for example, a rechargeable battery and may be detachably coupled to the rear case 100-2 for charging or the like.

The microphone 123 may be disposed in the front surface of the rear case 100-2, i.e., in the rear surface of the mobile terminal 100 to collect an audio signal.

Figure 7:
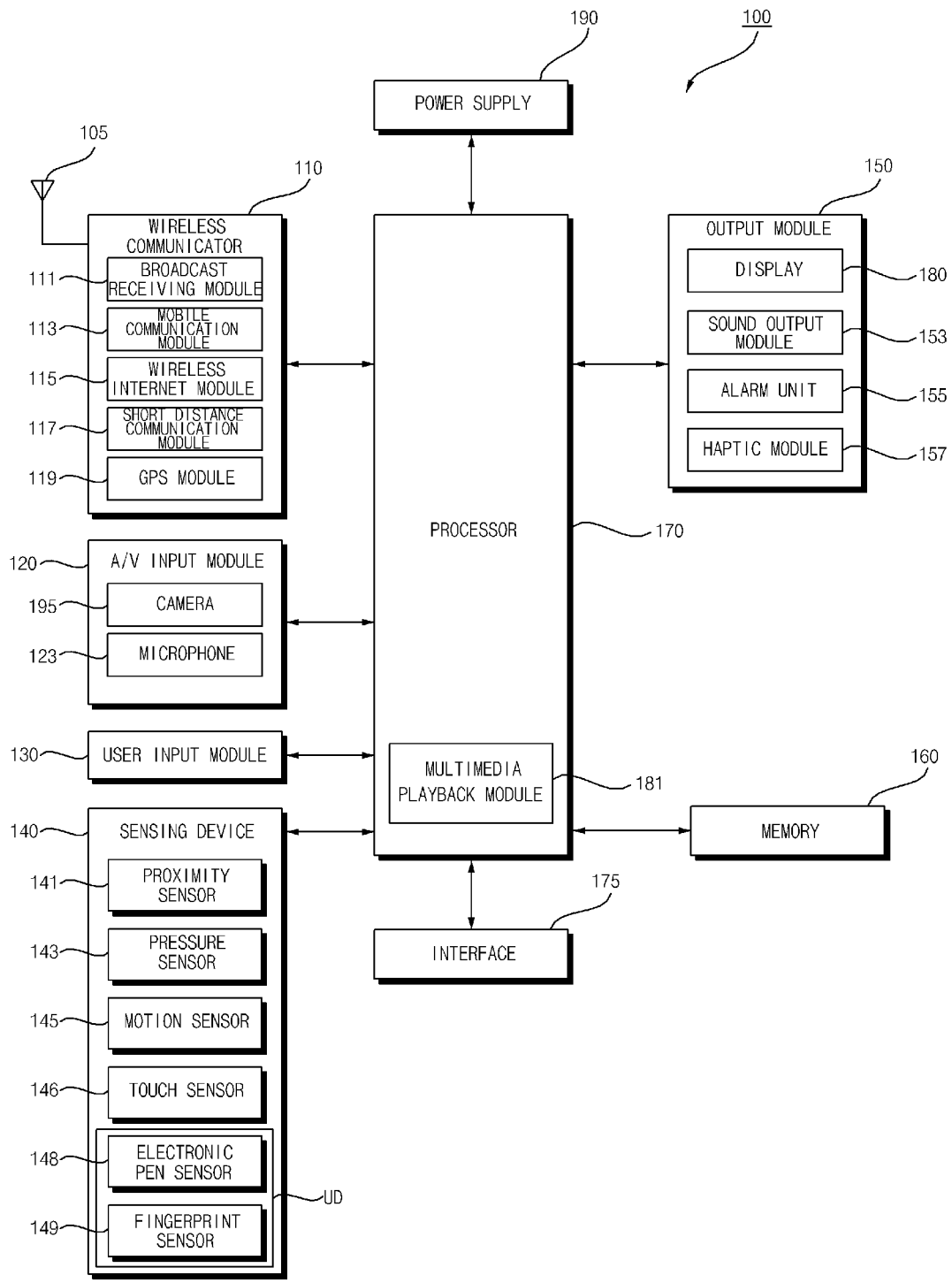
FIG. 7 is a block diagram of the mobile terminal of FIG. 6.

FIG. 7 is a block diagram of the mobile terminal of FIG. 6.

Referring to FIG. 7, the mobile terminal 100 may include a wireless communicator 110, an audio/video (A/V) input module 120, a user input module 130, a sensing device 140, an output module 150, a memory 160, an interface 175, a processor 170, and a power supply 190. When these components are implemented in an actual application, two or more components may be combined into one component if necessary, or one component may be divided into two or more components.

The wireless communicator 110 may include a broadcast receiving module 111, a mobile communication module 113, a wireless Internet module 115, a short distance communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short distance communication module 117 refers to a module for short distance communication. BLUETOOTH, Radio Frequency Identification (RFID), infrared Data Association (IrDA), Ultra Wideband (UWB), ZigBee, and Near Field Communication (NFC) may be used as a short distance communication technology.

The Global Position System (GPS) module 119 may receive position information from a plurality of GPS satellites.

The audio/video (A/V) input module 120 may be used to input an audio signal or a video signal, and may include a camera 195, the microphone 123, and the like.

The camera 195 may process an image frame such as a still image or a moving image acquired by an image sensor in a video call mode or a photographing mode. Then, the processed image frame may be displayed on the display 180.

The image frame processed by the camera 195 may be stored in the memory 160 or transmitted to the outside through the wireless communicator 110. Two or more cameras 195 may be provided according to the configuration of the terminal.

The camera 195 may include the first to fourth cameras 195*a*, 195*o*, 195*b*, and 195*c* shown in FIG. 6A.

The microphone 123 may receive an external audio signal by a microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the processor 170, or the like.

The user input module 130 may generate key input data that the user inputs for controlling the operation of the terminal. The user input module 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing device 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing device 140 may include a proximity sensor 141, a pressure sensor 143, a motion sensor 145, a touch sensor 146, an electronic pen sensor 146, and a fingerprint sensor 149.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for sensing position information and intensity information of the touch input. A sensing signal sensed by the touch sensor 146 may be transmitted to the processor 180.

The electronic pen sensor 146 may be disposed at the lower part of the display 180, and may sense motion and pen pressure of the electronic pen 400. In addition, the electronic pen sensor 146 may further sense the tilt of the electronic pen 400.

The fingerprint sensor 149 may be disposed at the lower part of the display 180, and may sense a fingerprint through image capture.

Meanwhile, the electronic pen sensor 146 and the fingerprint sensor 149 may be embodied as a single apparatus, which may be called an electronic pen sensing apparatus UD.

The output module 150 may be used to output an audio signal, a video signal, or an alarm signal. The output module 150 may include a display 180, a sound output module 153, an alarm unit 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communicator 110 or stored in the memory 160 in a call signal reception, a call mode or a recording mode, a voice recognition mode, a broadcast reception mode, and the like. In addition, the sound output module 153 may output an audio signal related to the function performed in the mobile terminal 100, e.g., a call signal reception tone, a message reception tone, and the like. The sound output module 153 may include a speaker, a buzzer, and the like.

The alarm unit 155 may output a signal for notifying the occurrence of an event of the mobile terminal 100. The alarm unit 155 may output a signal for notifying the occurrence of an event in a different form from an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized to be outputted or may be sequentially outputted.

The memory 160 may store a program for the processing and controlling of the processor 170, and may serve to temporarily store inputted or outputted data (e.g., a phone book, a message, a still image, a moving image, or the like).

The interface 175 may serve as an interface with all external apparatuses connected to the mobile terminal 100. The interface 175 may receive data from an external apparatus or receive power from the external apparatus to transmit to each component in the mobile terminal 100, and allow the data in the mobile terminal 100 to be transmitted to the external apparatus.

The processor 170 may control, in general, the operation of each unit to control the overall operation of the mobile terminal 100. For example, the processor 170 may perform relevant control and processing for voice call, data communication, video call, and the like. In addition, the processor 170 may include a multimedia playback module 181 for playing multimedia. The multimedia playback module 181 may be configured in hardware inside the processor 170 or may be configured in software separately from the processor 170. Meanwhile, the processor 170 may include an application processor (not shown) for driving an application. Alternatively, the application processor (not shown) may be provided separately from the processor 170.

The power supply 190 may receive external power or internal power under the control of the processor 170 to supply power required for operation of each component.

FIGS. 8A to 27 are reference views illustrating the operation of an electronic pen sensing apparatus according to an embodiment of the present disclosure.

Figure 8A:
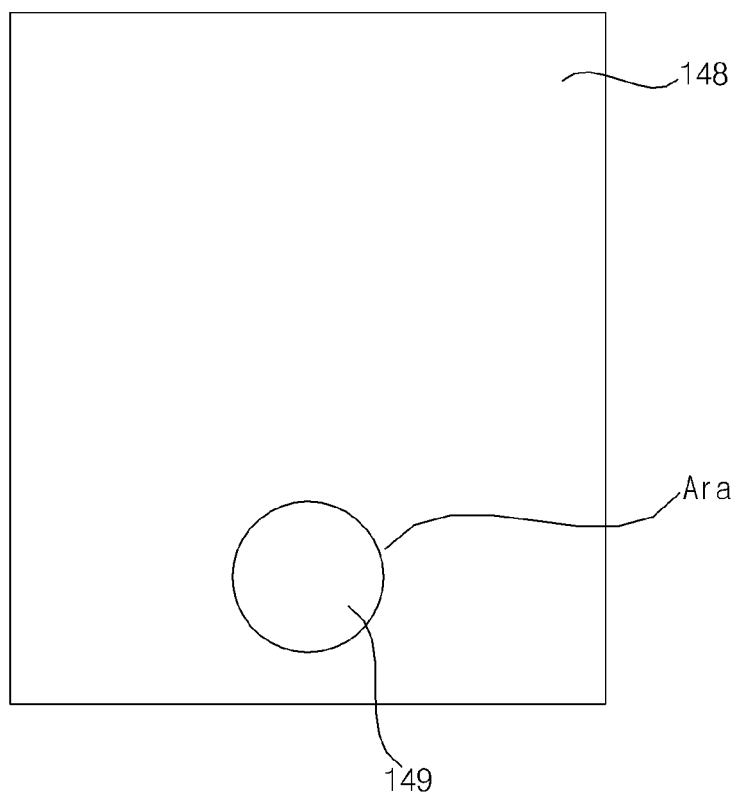
FIGS. 8A to 27 are reference views illustrating the operation of an electronic pen sensing apparatus according to an embodiment of the present disclosure.
Figure 8B:
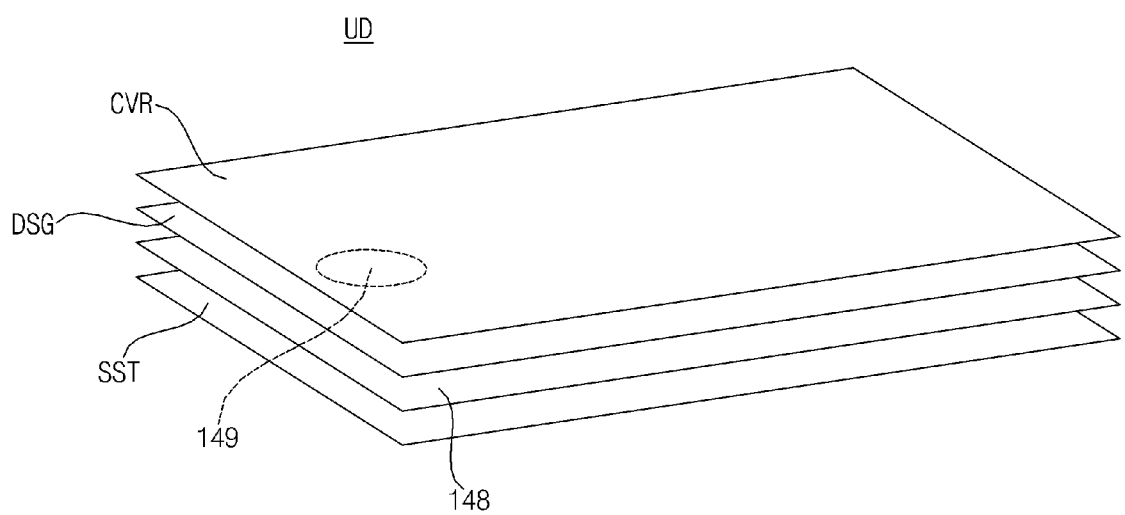

FIG. 8A is a view showing an electronic pen sensing apparatus according to an embodiment of the present disclosure, and FIG. 8B is a perspective view of the electronic pen sensing apparatus according to the embodiment of the present disclosure.

Referring to the figures, the electronic pen sensing apparatus UD according to the embodiment of the present disclosure includes an electronic pen sensor 148 disposed at the upper part or the lower part of a display DSG and a heterogeneous sensor 149 disposed at the lower part of the display DSG.

In the figures, the electronic pen sensor 148 is shown as being disposed at the lower part of the display DSG.

FIG. 8B shows that a cover glass CVR is disposed at the upper part of the display DSG, the electronic pen sensor 148 and the heterogeneous sensor 149 are disposed at the lower part of the display DSG, and a shielding sheet SST is disposed at the lower part of the electronic pen sensor 148 and the heterogeneous sensor 149.

In order to sense the electronic pen 400, the electronic pen sensor 148 may include a flexible printed circuit board FPCB including a plurality of loop antenna coils and ferrite.

Specifically, the ferrite may be disposed at the lower part of the flexible printed circuit board FPCB.

Meanwhile, the plurality of loop antenna coils may include a plurality of x-axis loop antenna coils and a plurality of y-axis loop antenna coils.

The plurality of x-axis loop antenna coils may be referred to as a plurality of first channel sensors, and the plurality of y-axis loop antenna coils may be referred to as a plurality of second channel sensors.

The shielding sheet SST may include a shielding material configured to shield noise or an electromagnetic field.

Meanwhile, the heterogeneous sensor 149 may be a fingerprint sensor. However, the present disclosure is not limited thereto, and various modifications are possible.

Meanwhile, in order to operate the electronic pen sensor 148 and the heterogeneous sensor 149, it is preferable for the electronic pen sensor 148 not to be disposed in a first area Ara corresponding to the heterogeneous sensor 149.

For example, it is preferable for the electronic pen sensor 148 to be disposed in an area other than the first area Ara. In addition, it is preferable for the heterogeneous sensor 149 to be disposed in the first area Ara. As a result, the electronic pen sensor and the heterogeneous sensor may be embodied together.

FIGS. 9A to 9D are sectional views showing various examples of the electronic pen sensing apparatus according to the embodiment of the present disclosure.

Referring to FIGS. 9A to 9D, the electronic pen sensing apparatus UD including the electronic pen sensor 148 and the heterogeneous sensor 149 is disposed at the lower part of the display DSG.

The cover glass CVR is disposed at the upper part of the display DSG, and the shielding sheet SST is disposed at the lower part of the electronic pen sensor 148 and the heterogeneous sensor 149.

Meanwhile, the electronic pen sensor 148 may include a flexible printed circuit board FPCB including a plurality of loop antenna coils and ferrite disposed at the lower part of the flexible printed circuit board FPCB.

Meanwhile, the heterogeneous sensor 149 may be formed through the flexible printed circuit board FPCB and the ferrite in the first area.

Figure 9A:
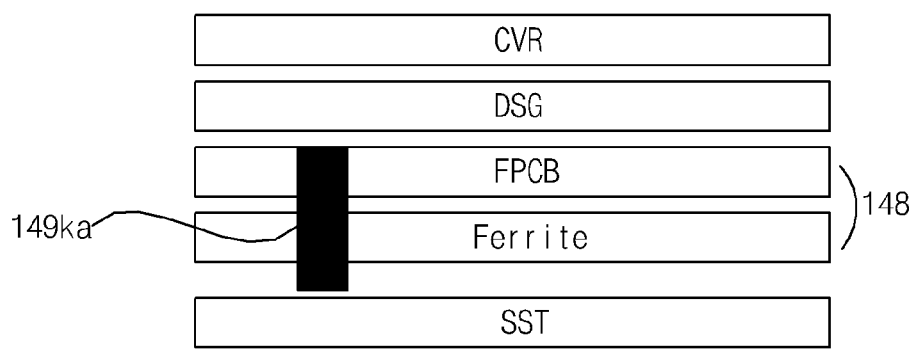

In an electronic pen sensing apparatus UDka of FIG. 9A, a heterogeneous sensor 149ka may be formed through the flexible printed circuit board FPCB and the ferrite, and particularly may be formed to protrude toward the shielding sheet SST.

As a result, the thickness of the heterogeneous sensor 149ka of FIG. 9A is greater than the thickness of the electronic pen sensor 148 including the flexible printed circuit board FPCB and the ferrite.

Figure 9B:
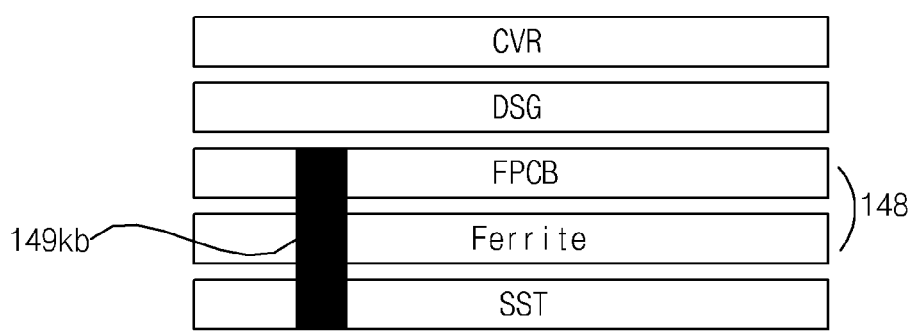

In an electronic pen sensing apparatus UDkb of FIG. 9B, a heterogeneous sensor 149kb may be formed through the flexible printed circuit board FPCB and the ferrite, and may also be formed through the shielding sheet SST.

As a result, the thickness of the heterogeneous sensor 149kb of FIG. 9B may be equal to the sum of the thicknesses of the electronic pen sensor 148 and the shielding sheet SST.

Figure 9C:
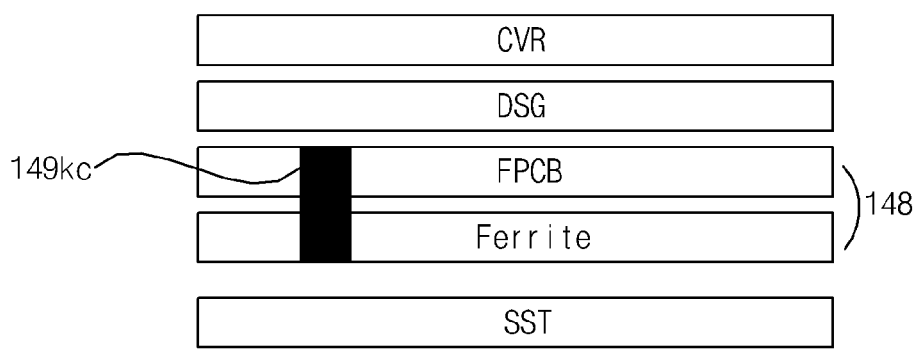

In an electronic pen sensing apparatus UDkc of FIG. 9C, a heterogeneous sensor 149kc may be formed through the flexible printed circuit board FPCB and the ferrite.

As a result, the thickness of the heterogeneous sensor 149kc of FIG. 9C may be equal to the thicknesses of the electronic pen sensor 148.

Figure 9D:
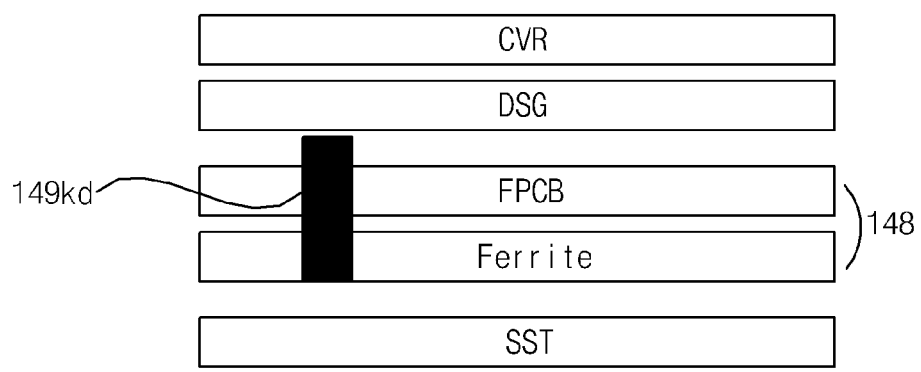

In an electronic pen sensing apparatus UDkd of FIG. 9D, a heterogeneous sensor 149kd may be formed through the flexible printed circuit board FPCB and the ferrite, and may protrude toward the display DSG.

As a result, the thickness of the heterogeneous sensor 149kd of FIG. 9D is greater than the thickness of the electronic pen sensor 148 including the flexible printed circuit board FPCB and the ferrite.

Figure 10A:
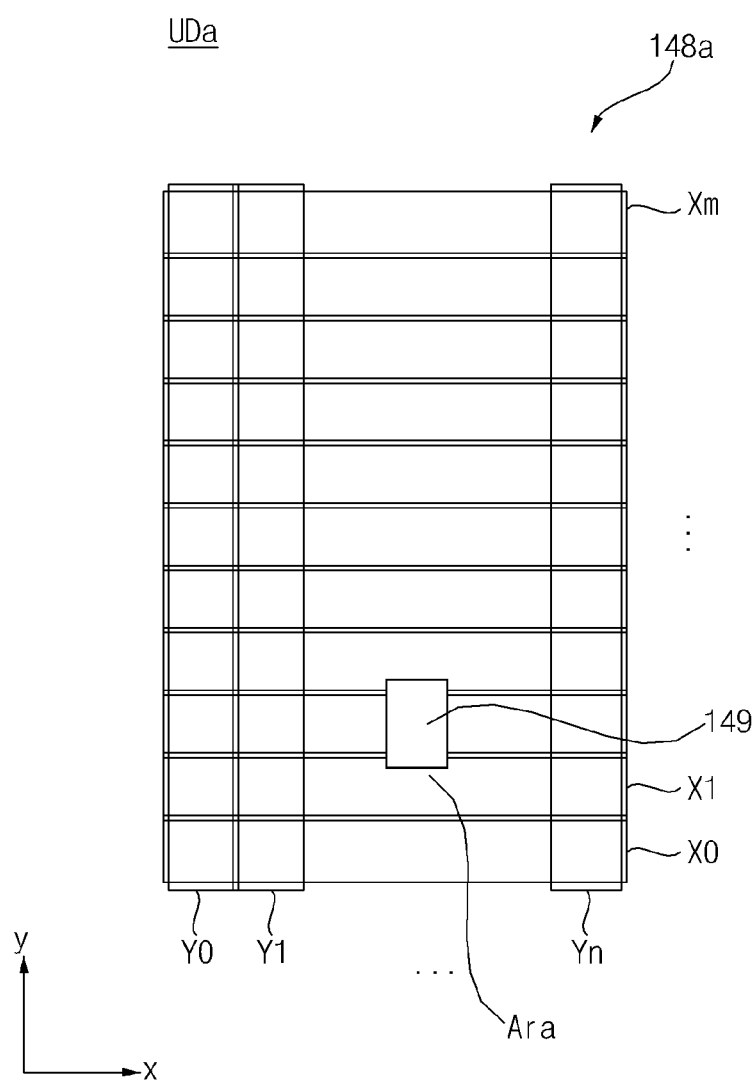

FIG. 10A is a view showing an example of the structure of the electronic pen sensor in the electronic pen sensing apparatus according to the embodiment of the present disclosure.

Referring to the figure, an electronic pen sensor 148a in an electronic pen sensing apparatus UDa may include a plurality of first channel sensors X0 to Xm disposed to extend in a first direction (an x-axis direction) and a plurality of second channel sensors Y0 to Yn disposed to extend in a second direction (a y-axis direction), which intersects the first direction (the x-axis direction).

The first channel sensors X0 to Xm and the second channel sensors Y0 to Yn are not disposed in the first area Ara corresponding to the heterogeneous sensor 149. As a result, the electronic pen sensor 148a and at least one heterogeneous sensor 149 may be embodied together.

Meanwhile, each of the plurality of first channel sensors X0 to Xm is disposed to partially overlap first channel sensors adjacent thereto. Each of the plurality of second channel sensors Y0 to Yn is disposed to partially overlap second channel sensors adjacent thereto. Consequently, it is possible to sense sensing signals through the plurality of first channel sensors X0 to Xm or the plurality of second channel sensors Y0 to Yn.

Meanwhile, the electronic pen sensor 148a of FIG. 10A may include 23 first channel sensors X0 to X22 and 11 second channel sensors Y0 to Y10.

In this case, the 11 second channel sensors Y0 to Y10 may be disposed at the lower part of the 23 first channel sensors X0 to X22.

Figure 10B:
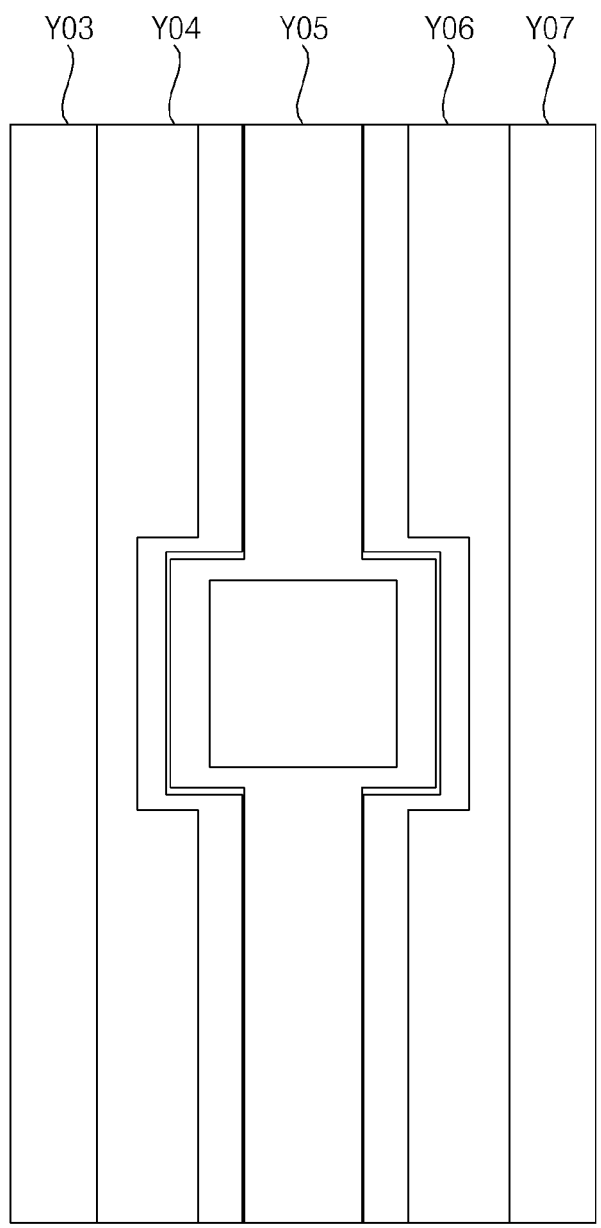

FIG. 10B is a partial enlarged view of the electronic pen sensor 148a of FIG. 10A.

FIG. 10B shows a plurality of second channel sensors Y03 to Y07 disposed near the first area Ara, in which the heterogeneous sensor 149 is disposed, among the 23 first channel sensors X0 to X22 and the 11 second channel sensors Y0 to Y10.

FIG. 10B shows the plurality of second channel sensors Y03 to Y07 partially overlapping each other.

Figure 10C:
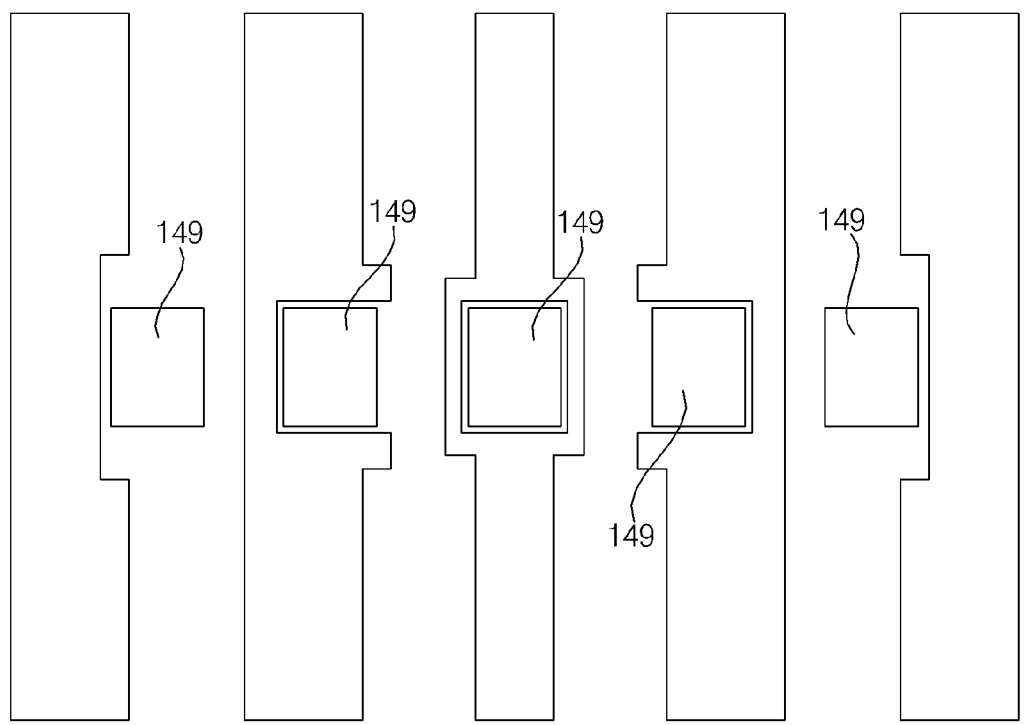

FIG. 10C is a development view of the plurality of second channel sensors Y03 to Y07 of FIG. 10B.

Referring to FIGS. 10B and 10C, the channel sensor Y03 and the channel sensor Y07 are symmetric with respect to the first area, and have recesses formed in areas corresponding to the first area Ara so as not to overlap the first area Ara.

The channel sensor Y04 and the channel sensor Y06 are symmetric with respect to the first area, and have recesses formed in areas corresponding to the first area Ara so as not to overlap the first area Ara.

Meanwhile, the channel sensor Y03 and the channel sensor Y04 may partially overlap each other, and the channel sensor Y06 and the channel sensor Y07 may partially overlap each other.

Meanwhile, the channel sensor Y05 is formed around an area other than the first area Ara.

Meanwhile, the channel sensor Y05 may partially overlap the channel sensor Y03 and the channel sensor Y04.

Figure 10D:
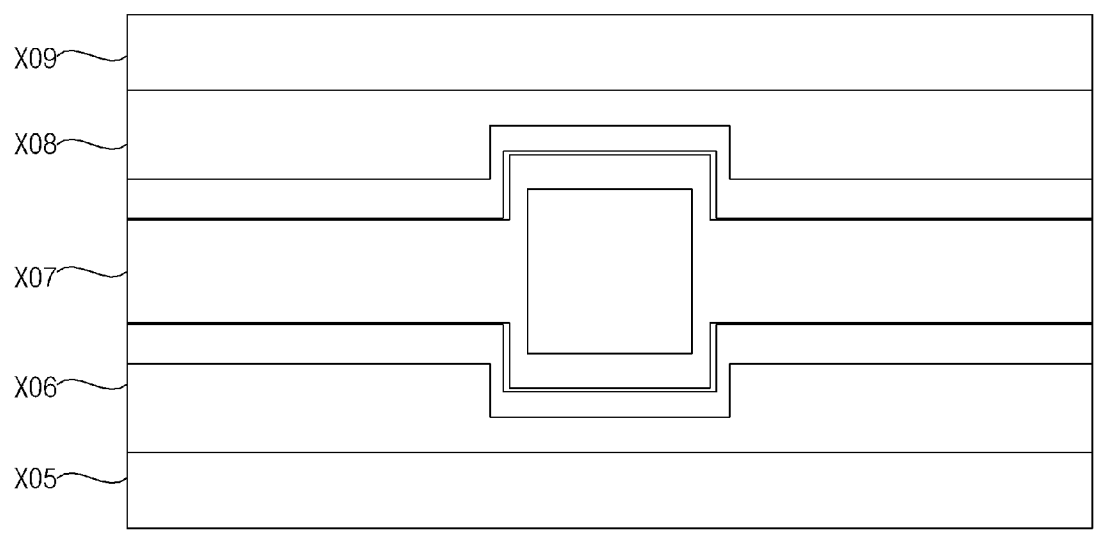

FIG. 10D shows a plurality of first channel sensors X05 to X09 disposed near the first area Ara, in which the heterogeneous sensor 149 is disposed.

FIG. 10D shows the plurality of first channel sensors X05 to X09 partially overlapping each other.

The channel sensor X05 and the channel sensor X09 are symmetric with respect to the first area, and have recesses formed in areas corresponding to the first area Ara so as not to overlap the first area Ara.

The channel sensor X06 and the channel sensor X08 are symmetric with respect to the first area, and have recesses formed in areas corresponding to the first area Ara so as not to overlap the first area Ara.

Meanwhile, the channel sensor X05 and the channel sensor X06 may partially overlap each other, and the channel sensor X08 and the channel sensor X09 may partially overlap each other.

Meanwhile, the channel sensor X07 is formed around an area other than the first area Ara.

Meanwhile, the channel sensor X07 may partially overlap the channel sensor X06 and the channel sensor X08.

Figure 11:
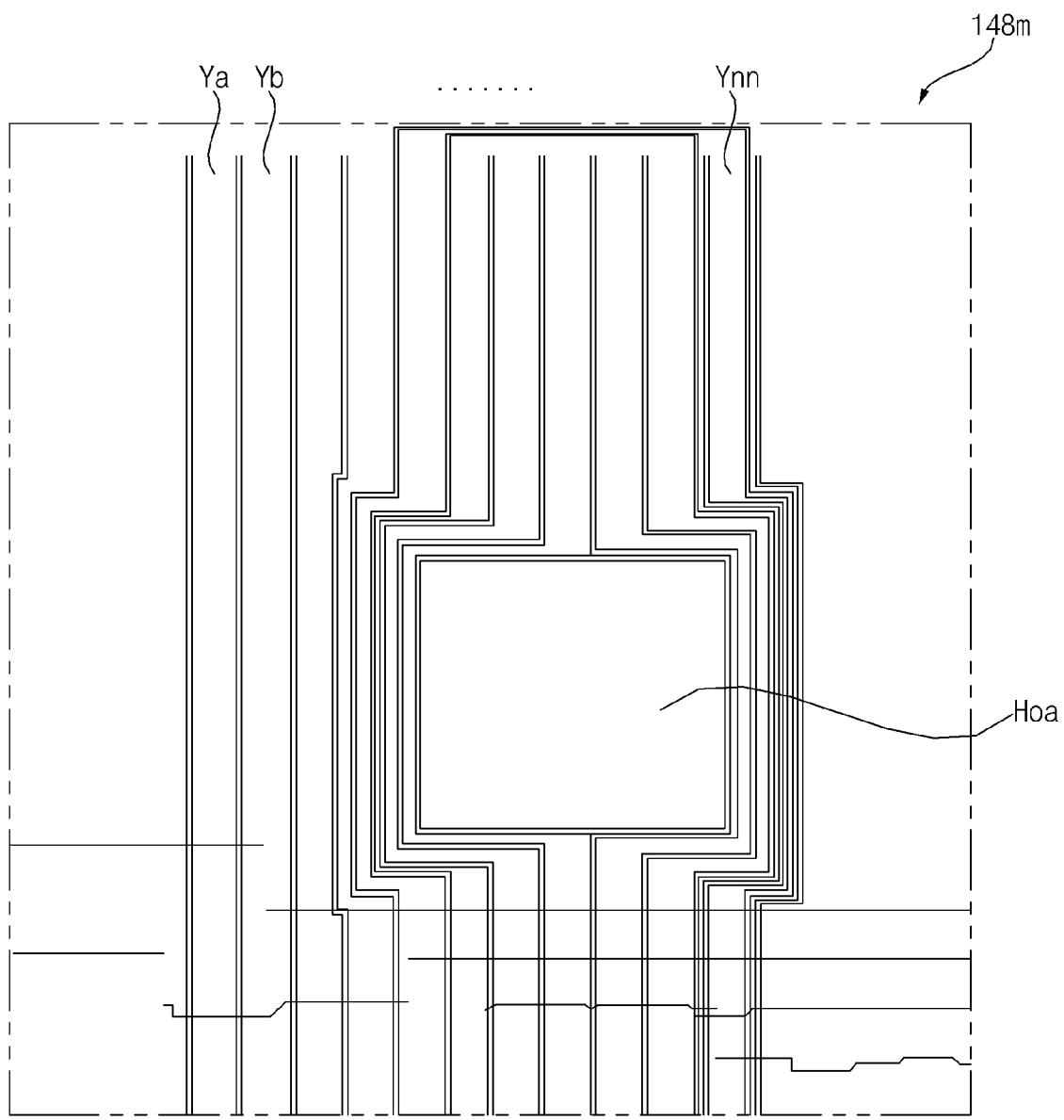

FIG. 11 is a view showing an example of the shape of an electronic pen sensor 148m having a through hole Hoa formed therein.

Referring to the figure, the through hole Hoa is formed such that the heterogeneous sensor 149 is disposed therein, and a plurality of first channel sensors X0 to Xm and a plurality of second channel sensors Y0 to Yn may be symmetric with respect to the through hole Hoa.

Figure 12:
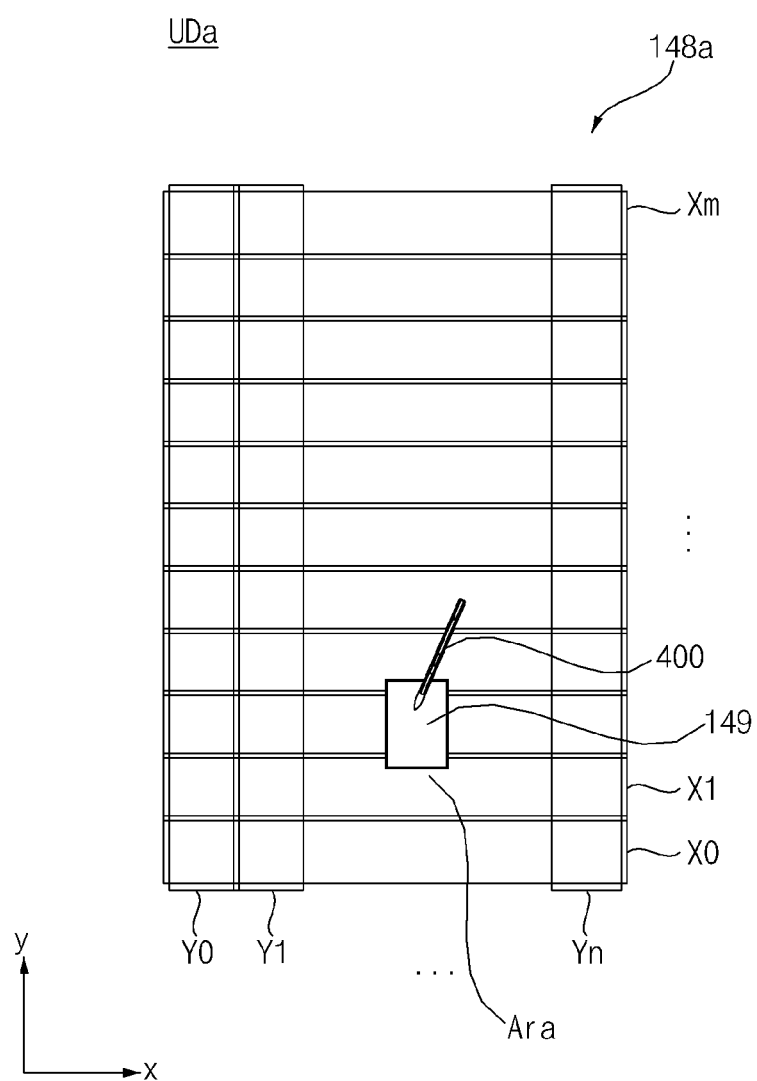

FIG. 12 shows the case in which the electronic pen sensor is located in the first area of the electronic pen sensing apparatus.

Referring to the figure, the electronic pen sensor 148a in the electronic pen sensing apparatus UDa may include a plurality of first channel sensors X0 to Xm disposed to extend in the first direction (the x-axis direction) and a plurality of second channel sensors Y0 to Yn disposed to extend in the second direction (the y-axis direction), which intersects the first direction (the x-axis direction).

The first channel sensors X0 to Xm and the second channel sensors Y0 to Yn are not disposed in the first area Ara corresponding to the heterogeneous sensor 149.

Meanwhile, in the case in which the electronic pen 400 is located in the first area Ara of the electronic pen sensing apparatus UDa, in which the heterogeneous sensor 149 is disposed, accurate calculation of coordinate information may not be easily performed, since the electronic pen sensor 148a is not provided in the first area Ara.

In the present disclosure, when the electronic pen sensor 148a cannot sense a sensing signal in the first area Ara, a previous sensing signal is compensated for in order to calculate coordinate information in the first area Ara or near the first area Ara. Consequently, it is possible to calculate coordinate information of the electronic pen 400 even in the heterogeneous sensor area Ara, in which the electronic pen sensor 148a is not disposed. As a result, the electronic pen sensor 148a and at least one heterogeneous sensor 149 may be embodied together.

Figure 13:
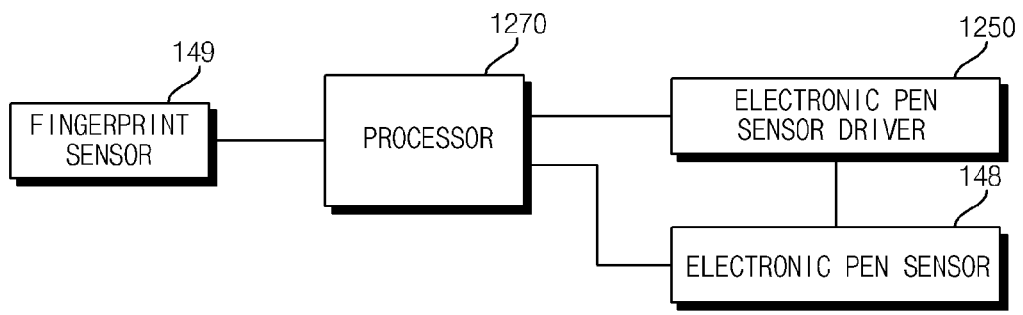

FIG. 13 shows an example of an internal block diagram of the electronic pen sensing apparatus UD according to the embodiment of the present disclosure.

Referring to the figure, the electronic pen sensing apparatus UD according to the embodiment of the present disclosure may include an electronic pen sensor 148, a heterogeneous sensor 149, a processor 1270, and an electronic pen sensor driver 1250.

The electronic pen sensor 148 may include a plurality of first channel sensors X0 to Xm disposed to extend in the first direction (the x-axis direction) and a plurality of second channel sensors Y0 to Yn disposed to extend in the second direction (the y-axis direction), which intersects the first direction (the x-axis direction). The first channel sensors X0 to Xm and the second channel sensors Y0 to Yn may not be disposed in the first area Ara corresponding to the heterogeneous sensor 149.

Meanwhile, the plurality of first channel sensors X0 to Xm may be disposed to overlap each other, and the plurality of second channel sensors Y0 to Yn may be disposed to overlap each other. Consequently, the electronic pen sensor 148 may sense sensing signals through the plurality of first channel sensors X0 or the plurality of second channel sensors Y0 to Yn.

The electronic pen sensor driver 1250 may output a driving signal to the electronic pen sensor 148 under control of the processor 1270, may receive a sensing signal sensed by the electronic pen sensor 148, and may transmit the received sensing signal to the processor 1270.

The processor 1270 may control overall operation of the electronic pen sensing apparatus UD.

The processor 1270 may be electrically connected to the electronic pen sensor 148, may output a driving signal to the electronic pen sensor 148, and may calculate coordinate information of the electronic pen 400 based on the sensing signal sensed by the electronic pen sensor 148.

Meanwhile, in the case in which the electronic pen 400 is located in a second area, the processor 1270 calculates first coordinate information of the electronic pen 400 based on a first sensing signal sensed by the electronic pen sensor 148. In the case in which the electronic pen 400 moves from the second area to the first area Ara or the vicinity of the first area Ara, the processor 1270 calculates second coordinate information of the electronic pen 400 based on a compensation signal obtained by compensating for the first sensing signal. Consequently, it is possible to calculate coordinate information of the electronic pen 400 even in the heterogeneous sensor area, in which the electronic pen sensor 148 is not disposed.

Meanwhile, in the case in which the electronic pen 400 moves from the second area to the first area Ara or the vicinity of the first area Ara, the processor 1270 may compensate for sensing signals sensed by at least some of the plurality of first channel sensors X0 to Xm or at least some of the plurality of second channel sensors Y0 to Yn, and may calculate second coordinate information of the electronic pen 400 based on the compensation signals. Consequently, it is possible to calculate coordinate information of the electronic pen 400 even in the heterogeneous sensor area, in which the electronic pen sensor 148 is not disposed.

Meanwhile, the processor 1270 may compensate for the sensing signals sensed by the at least some of the plurality of first channel sensors X0 to Xm using the average of levels of a plurality of sensing signals. Consequently, it is possible to calculate coordinate information of the electronic pen 400 even in the heterogeneous sensor area, in which the electronic pen sensor 148 is not disposed.

Meanwhile, the processor 1270 may perform setting such that sensing signals nearer the first area Ara have higher weights and may then compensate for the sensing signals sensed by the at least some of the plurality of first channel sensors X0 to Xm. Consequently, it is possible to calculate coordinate information of the electronic pen 400 even in the heterogeneous sensor area, in which the electronic pen sensor 148 is not disposed.

Meanwhile, the plurality of first channel sensors X0 to Xm may be symmetric with respect to the first area Ara. Consequently, the processor 1270 may perform signal compensation using sensing signals sensed by the plurality of first channel sensors X0 to Xm.

Meanwhile, the plurality of second channel sensors Y0 to Yn may be symmetric with respect to the first area Ara. Consequently, the processor 1270 may perform signal compensation using sensing signals sensed by the plurality of second channel sensors Y0 to Yn.

Meanwhile, in the case in which the electronic pen 400 is located at a position farther than a first distance D1, the processor 1270 may be configured to output a driving signal having a first driving frequency F1. In the case in which the electronic pen 400 is located between the first distance D1 and a second distance D2, the processor 1270 may be configured to output a driving signal having a second driving frequency F2 higher than the first driving frequency F1. Consequently, it is possible to sense the electronic pen 400 while efficiently consuming power.

Meanwhile, in the case in which the electronic pen 400 is located within a third distance D3 nearer than the second distance D2, the processor 1270 may be configured to output a driving signal having a third driving frequency F3 higher than the second driving frequency F2. Consequently, it is possible to accurately calculate coordinate information of the electronic pen 400.

Meanwhile, in the case in which the electronic pen 400 is located between the second distance D2 and the third distance D3, the processor 1270 may perform first direction (x-axis direction) sensing and second direction (y-axis direction) sensing according to first direction (x-axis direction) driving. In the case in which the electronic pen 400 is located within the third distance D3, the processor 1270 may perform first direction (x-axis direction) sensing and second direction (y-axis direction) sensing according to second direction (y-axis direction) driving. Consequently, it is possible to sense the electronic pen 400 and to accurately calculate coordinate information of the electronic pen 400.

Meanwhile, the processor 1270 may perform control such that the driving signal having the first driving frequency F1 is output. In the case in which the level of the sensing signal sensed by the electronic pen sensor 148 is between a first reference value THD1 and a second reference value THD2, the processor 1270 may be configured to output driving signal having the second driving frequency F2 higher than the first driving frequency F1. Consequently, it is possible to sense the electronic pen 400 while efficiently consuming power.

Meanwhile, in the case in which the level of the sensing signal sensed by the electronic pen sensor 148 while the driving signal having the second driving frequency F2 is output is equal to or greater than a third reference value THD3 higher than the second reference value THD2, the processor 1270 may be configured to output the driving signal having the third driving frequency F3 higher than the second driving frequency F2. Consequently, it is possible to accurately calculate coordinate information of the electronic pen 400.

Meanwhile, in the case in which the level of the sensing signal sensed by the electronic pen sensor 148 is between the second reference value THD2 and the third reference value THD3, the processor 1270 may perform first direction (x-axis direction) sensing and second direction (y-axis direction) sensing according to first direction (x-axis direction) driving. In the case in which the level of the sensing signal sensed by the electronic pen sensor 148 is equal to or greater than the third reference value THD3, the processor 1270 may perform first direction (x-axis direction) sensing and second direction (y-axis direction) sensing according to second direction (y-axis direction) driving. Consequently, it is possible to sense the electronic pen 400 and to accurately calculate coordinate information of the electronic pen 400.

FIGS. 14 to 17 are reference views illustrating the operation of the electronic pen sensing apparatus UD of FIG. 13.

Figure 14:
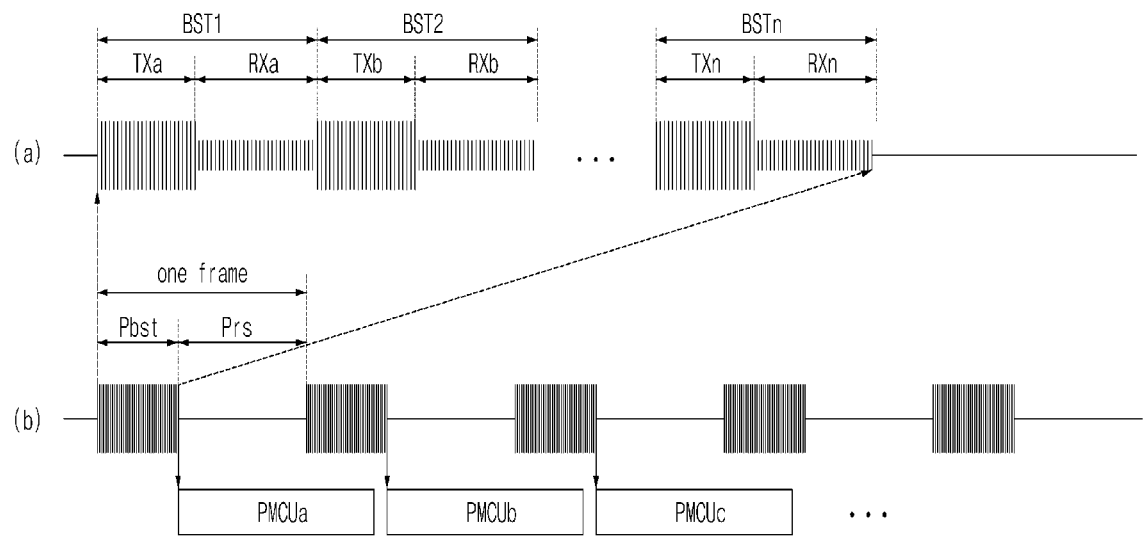

FIG. 14 is a timing diagram of driving periods Txa to Txn and sensing periods Rxa to Rxn of the electronic pen sensor 148 output from the electronic pen sensor driver 1250.

Referring to the figure, one frame period may include a driving and sensing period Pbst for driving and sensing and a calculation period Prs for coordinate information calculation by the processor 1270.

The one frame period may vary depending on the distance between the electronic pen 400 and the electronic pen sensing apparatus UD.

As an example, in the case in which the electronic pen 400 is located at a position farther than the first distance D1, at which the electronic pen 400 is not recognized, the one frame period may be a period corresponding to a first driving frequency F1 of 10 Hz.

As another example, in the case in which the electronic pen 400 is located between the first distance D1 and the second distance D2, between which the electronic pen 400 is recognized, the one frame period may be a period corresponding to a second driving frequency F2 of 40 Hz.

As a further example, in the case in which the electronic pen 400 is located within the third distance D3 nearer than the second distance D2, the one frame period may be a period corresponding to a third driving frequency F3 of 360 Hz.

Meanwhile, the driving and sensing period Pbst may include a plurality of burst periods BST1 to BSTn for driving and sensing of a plurality of channels.

The burst periods BST1 to BSTn may include driving periods Txa to Txn for channel driving and sensing periods Rxa to Rxn.

The processor 1270 may calculate amplitude and frequency based on a sensing signal sensed in the sensing periods Rxa to Rxn during the calculation period Prs, and may calculate the distance from the electronic pen 400 based on the amplitude.

In the case in which the level of the sensing signal is equal to or less than the first reference value THD1 during the calculation period Prs, the processor 1270 may determine that the distance from the electronic pen 400 is equal to or greater than the first distance D1.

In the case in which the level of the sensing signal is between the first reference value THD1 and the second reference value THD2 during the calculation period Prs, the processor 1270 may determine that the distance from the electronic pen 400 is between the first distance D1 and the second distance D2.

In the case in which the level of the sensing signal is equal to or less than the third reference value THD3 during the calculation period Prs, the processor 1270 may determine that the distance from the electronic pen 400 is within the third distance D3.

In the case in which the distance from the electronic pen 400 is equal to or greater than the third distance D3, the processor 1270 may be configured to execute a first mode. Here, the first mode may be a discovery mode.

In the case in which the distance from the electronic pen 400 is within the third distance D3 and does not contact the display 180 or the electronic pen sensing apparatus UD, the processor 1270 may be configured to execute a second mode. Here, the second mode may be a hover mode.

In the case in which the distance from the electronic pen 400 is within the third distance D3 and contacts the display 180 or the electronic pen sensing apparatus UD, the processor 1270 may be configured to execute a third mode. Here, the second mode may be a touch mode.

The processor 1270 may determine which of the first to third modes is to be executed based on the sensing signal during the calculation period Prs, and may calculate coordinate information, tilt information, pen pressure information, and hover distance information.

The processor 1270 may transmit the mode information, the coordinate information, the tilt information, the pen pressure information, and the hover distance information calculated during the calculation period Prs to an external device or the processor 170 of the electronic device 100.

Figure 15:
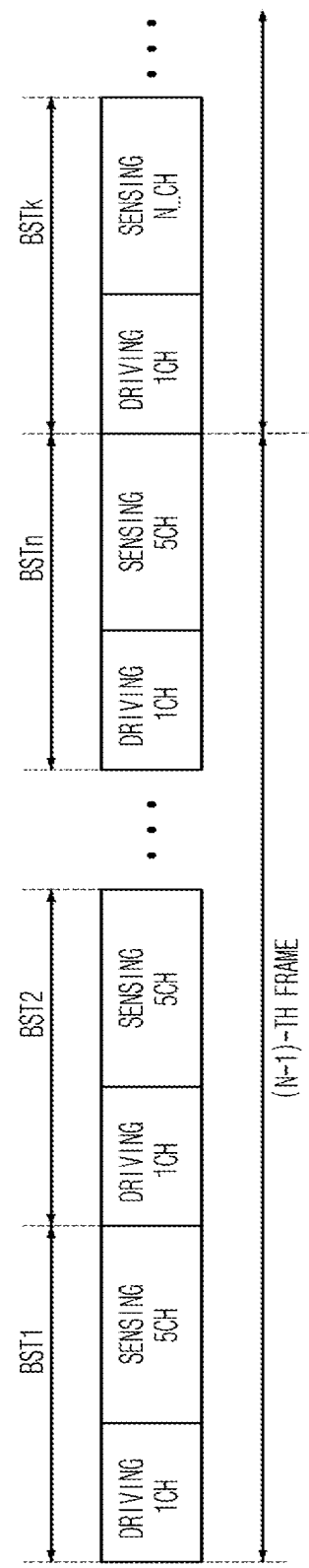

FIG. 15 shows a plurality of burst periods BST1 to BSTn in an (N−1)-th frame period and a plurality of burst periods BSTk, . . . in an N-th frame period.

Each of the burst periods BST1 to BSTn may include a driving period and a sensing period.

For example, each of the burst periods BST1 to BSTn may include one channel driving period and five channel sensing periods.

More specifically, each of the burst periods BST1 to BSTn may include one X-channel driving period and five X-channel sensing periods.

Meanwhile, X-channel sensing in numbers other than five is possible during the X-channel sensing periods.

Meanwhile, a first burst period BSTk of the N-th frame period after the (N−1)-th frame period may be a burst period of a channel of the previous frame in which the maximum level was sensed.

The first burst period BSTk may include one X-channel driving period and five X-channel sensing periods.

Meanwhile, X-channel sensing in numbers other than five is possible during the X-channel sensing periods.

Figure 16:
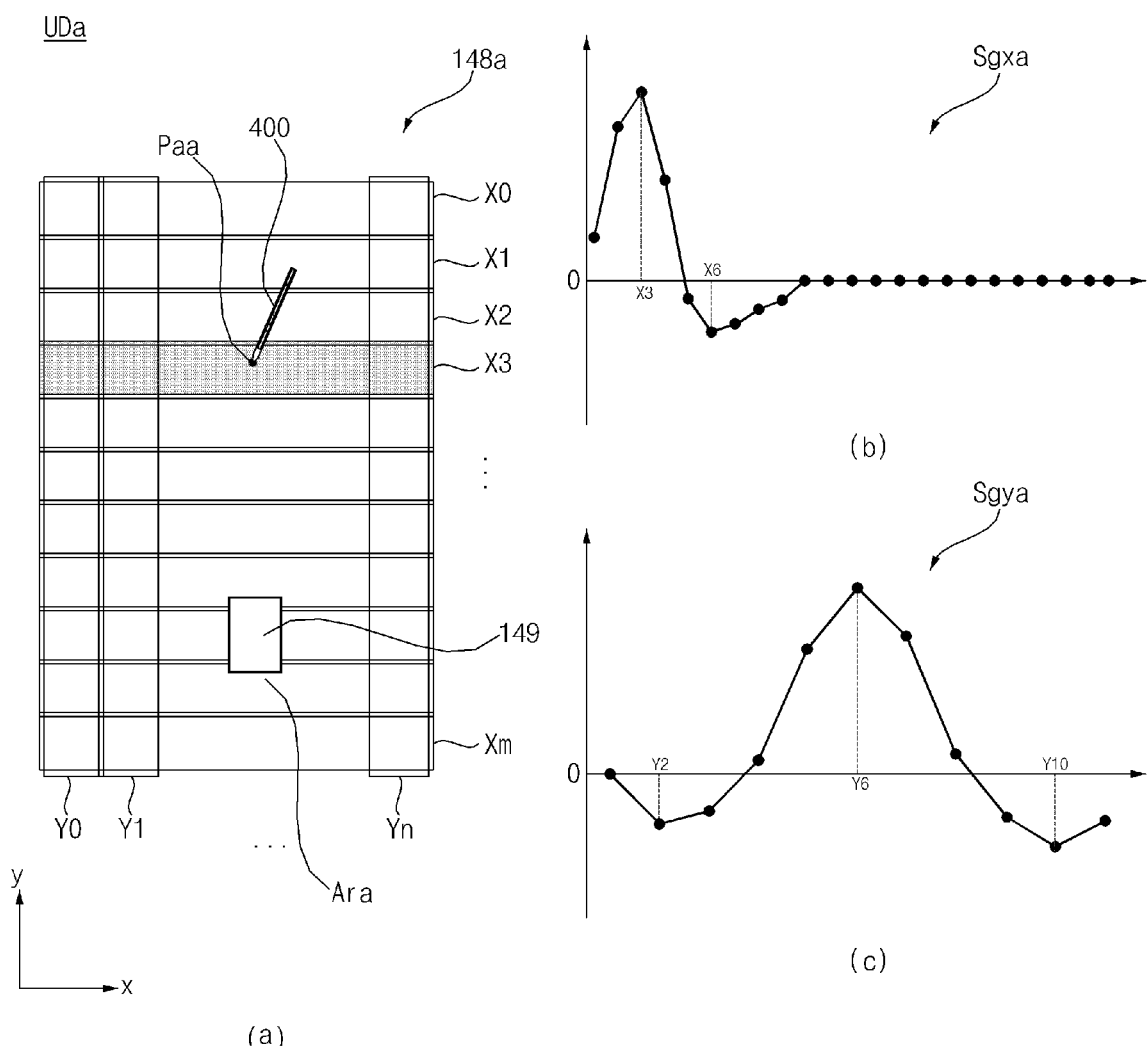

FIG. 16 shows the case in which the electronic pen 400 is located at a first point Paa of the electronic pen sensing apparatus UDa.

The first point Paa may be a position corresponding to a channel X3 and a channel Y6.

As described with reference to FIGS. 14 and 15, the processor 1270 may output a driving signal to the electronic pen sensor 148a during a driving period, and may receive a sensing signal from the electronic pen sensor 148a during a sensing period.

FIG. 16(*b*) shows an X-channel sensing signal Sgxa, wherein the level at the channel X3 is the highest and the level at a channel X6 is the lowest.

Consequently, the processor 1270 may determine that the electronic pen 400 is located at a position corresponding to the channel X3. That is, the processor 1270 may calculate X-axis coordinate information, among coordinate information.

FIG. 16(*c*) shows a Y-channel sensing signal Sgya, wherein the level at the channel Y6 is the highest, the levels at channels Y2 and Y10 are low, and particularly the level at the channel Y10 is the lowest.

Consequently, the processor 1270 may determine that the electronic pen 400 is located at a position corresponding to the channel Y6. That is, the processor 1270 may calculate y-axis coordinate information, among coordinate information.

As a result, referring to FIG. 16, the processor 1270 may calculate coordinate information corresponding to the channel X3 and the channel Y6.

Figure 17:
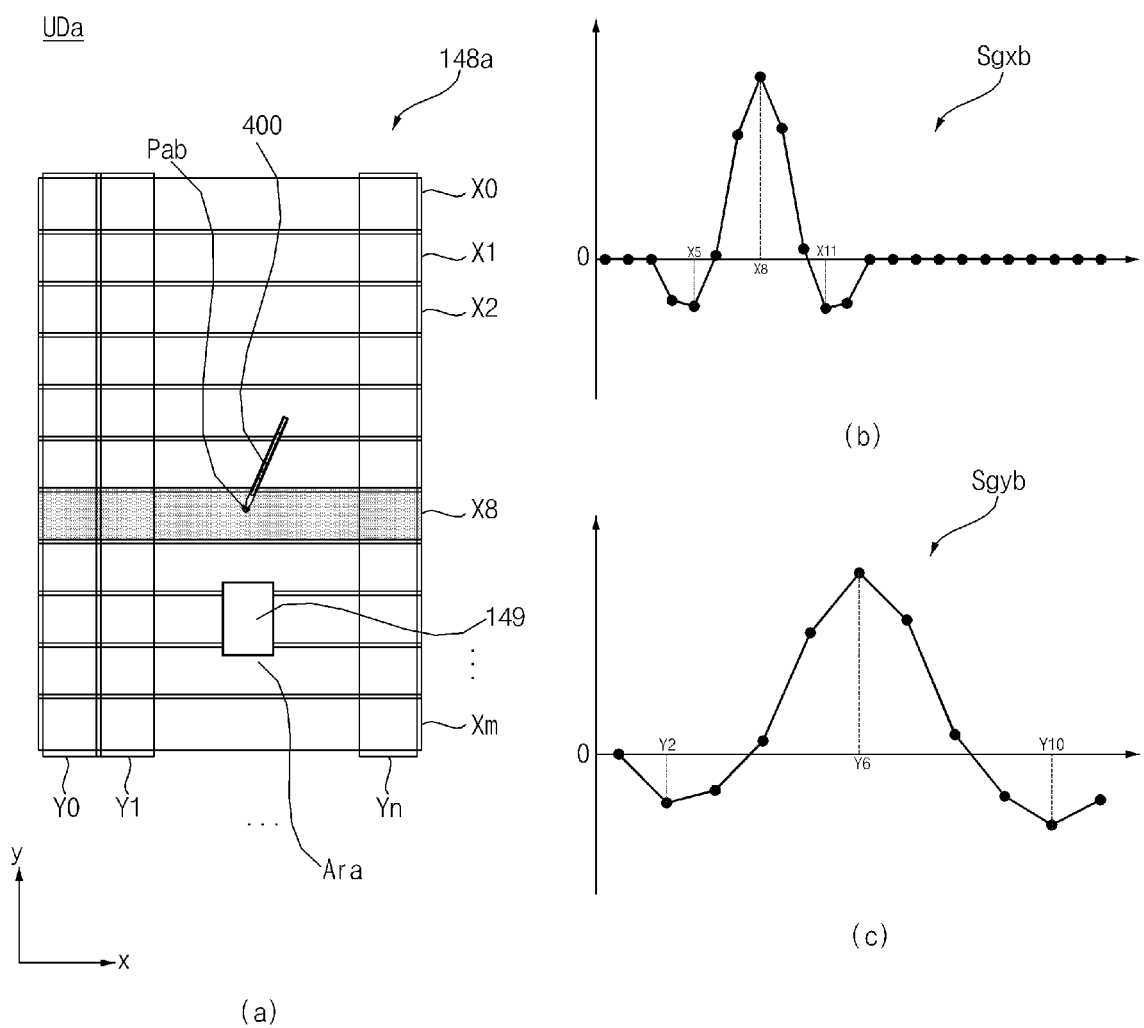

FIG. 17 shows the case in which the electronic pen 400 is located at a second point Pab of the electronic pen sensing apparatus UDa.

The second point Pab may be a position corresponding to a channel X8 and a channel Y6.

FIG. 17(*b*) shows an X-channel sensing signal Sgxa, wherein the level at the channel X8 is the highest and the levels at channels X5 and X11 are the lowest.

Consequently, the processor 1270 may determine that the electronic pen 400 is located at a position corresponding to the channel X8. That is, the processor 1270 may calculate X-axis coordinate information, among coordinate information.

FIG. 17(*c*) shows a Y-channel sensing signal Sgya, wherein the level at the channel Y6 is the highest, the levels at channels Y2 and Y10 are low, and particularly the level at the channel Y10 is the lowest.

Consequently, the processor 1270 may determine that the electronic pen 400 is located at a position corresponding to the channel Y6. That is, the processor 1270 may calculate y-axis coordinate information, among coordinate information.

As a result, referring to FIG. 17, the processor 1270 may calculate coordinate information corresponding to the channel X8 and the channel Y6.

Figure 18:
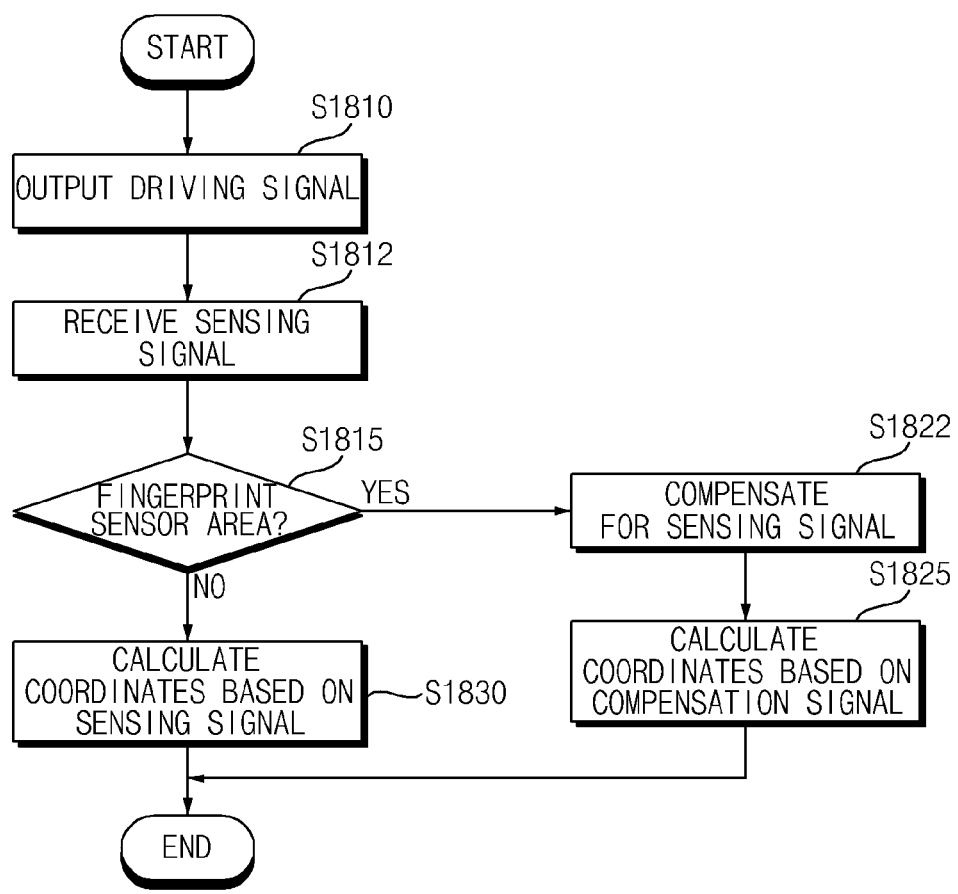

FIG. 18 is a flowchart showing an operation method of the electronic pen sensing apparatus UD according to the embodiment of the present disclosure.

Referring to the figure, the processor 1270 performs control such that a driving signal is output to the electronic pen sensor 148 during a driving period (S1810). Consequently, the electronic pen sensor driver 1250 outputs the driving signal to the electronic pen sensor 148.

Subsequently, the electronic pen sensor 148 receives a sensing signal during a sensing period (S1812). The received sensing signal is transmitted to the processor 1270.

The processor 1270 determines whether the area is a fingerprint sensor area based on the sensing signal (S1815). Upon determining that the area is not the fingerprint sensor area, the processor 1270 may calculate coordinate information based on the sensing signal (S1830).

For example, in the case in which the electronic pen 400 is located at the first point Paa, as shown in FIG. 16, the processor 1270 may calculate coordinate information corresponding to the channel X3 and the channel Y6 based on the X-channel sensing signal Sgxa of FIG. 16(*b*) and the Y-channel sensing signal Sgya of FIG. 16(*c*).

Upon determining in step S1815 that the area is the fingerprint sensor area, the processor 1270 may compensate for the sensing signal (S1822), and may calculate coordinate information based on the compensation signal (S1825).

FIGS. 19A to 19D are views showing a sensing signal and a compensation signal when the electronic pen 400 moves from outside the first area into the first area.

Figure 19A:
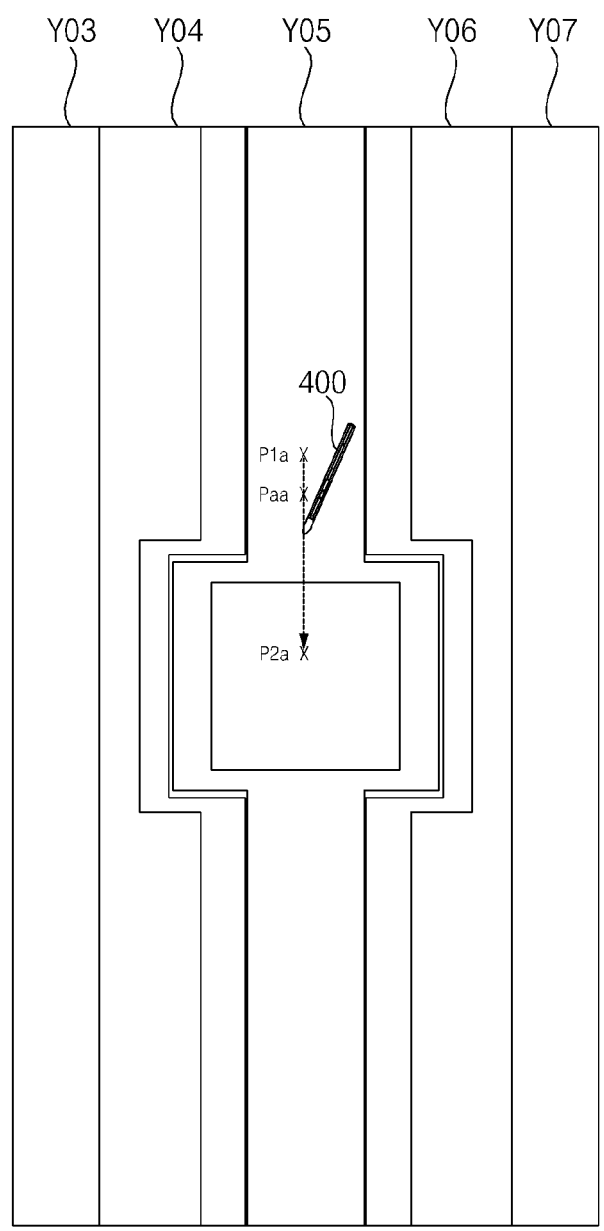

FIG. 19A shows that the electronic pen 400, located at a point P1a, moves downwards, passes through a point Paa, and moves to a point P2a in the first area Ara, in which the heterogeneous sensor 149 is disposed.

Figure 19B:
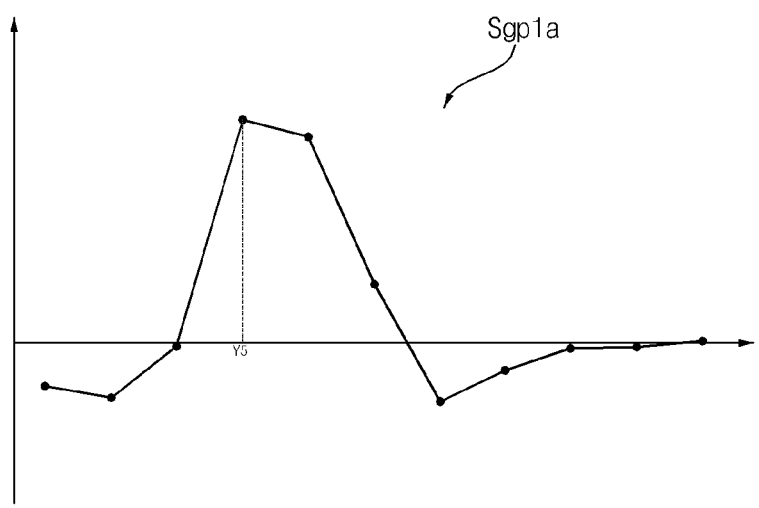

In the case in which the electronic pen 400 is located at the point P1a, the level at a channel Y5 of the sensing signal Sgp1a, may be the highest, as shown in FIG. 19B.

Figure 19C:
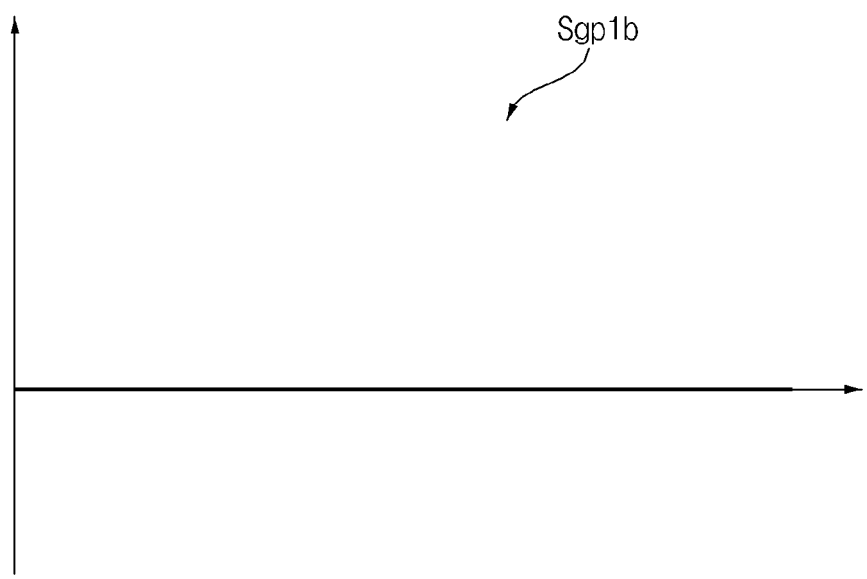

Meanwhile, in the case in which the electronic pen 400 is located at the point P2a, the level of a sensing signal Sgp1b may be zero (0), as shown in FIG. 19C. That is, no sensing may be performed.

Figure 19D:
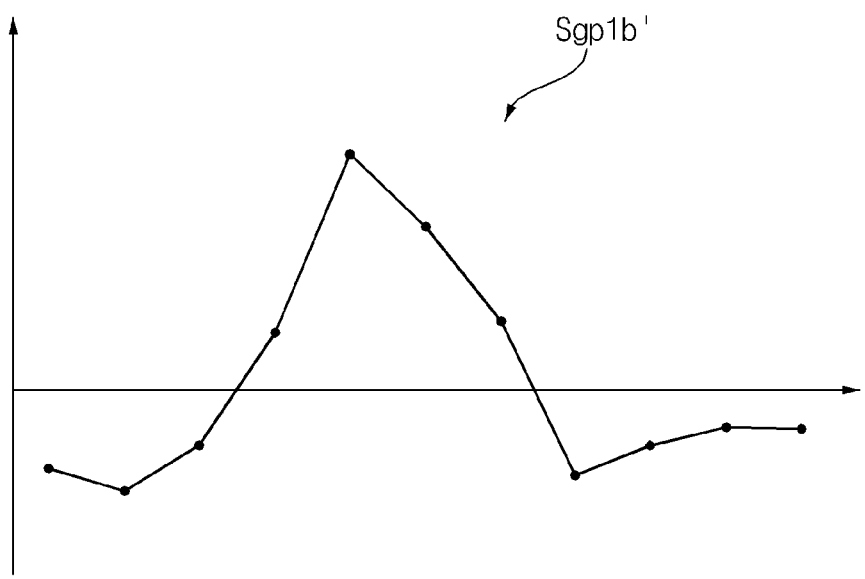

Consequently, the processor 1270 may generate a compensation signal Sgp1b' using the sensing signal Sgp1a of FIG. 19B, as shown in FIG. 19D.

For example, the processor 1270 may generate a compensation signal Sgp1b' having the highest level at a channel Y5 thereof, similarly to the sensing signal Sgp1a of FIG. 19B.

Consequently, the processor 1270 may calculate coordinate information even in the case in which the electronic pen 400 is located in the first area.

Although FIGS. 19A to 19D show the Y-channel sensing signal, it is also possible to compensate for sensing signals based on an X-channel sensing signal and to generate a compensation signal.

FIGS. 20A to 20D are views showing a sensing signal and a compensation signal when the electronic pen 400 moves from outside the first area to the vicinity of the first area.

Figure 20A:
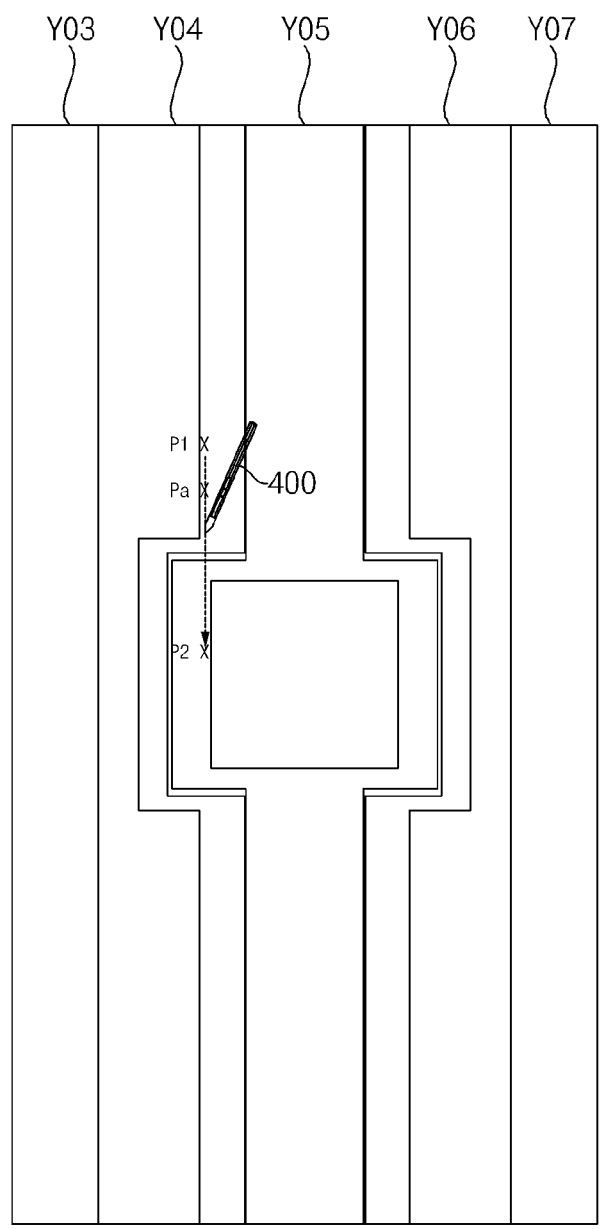

FIG. 20A shows that the electronic pen 400, located at a point P1, moves downwards, passes through a point Pa, and moves to a point P2 around the first area Ara, in which the heterogeneous sensor 149 is disposed.

Figure 20B:
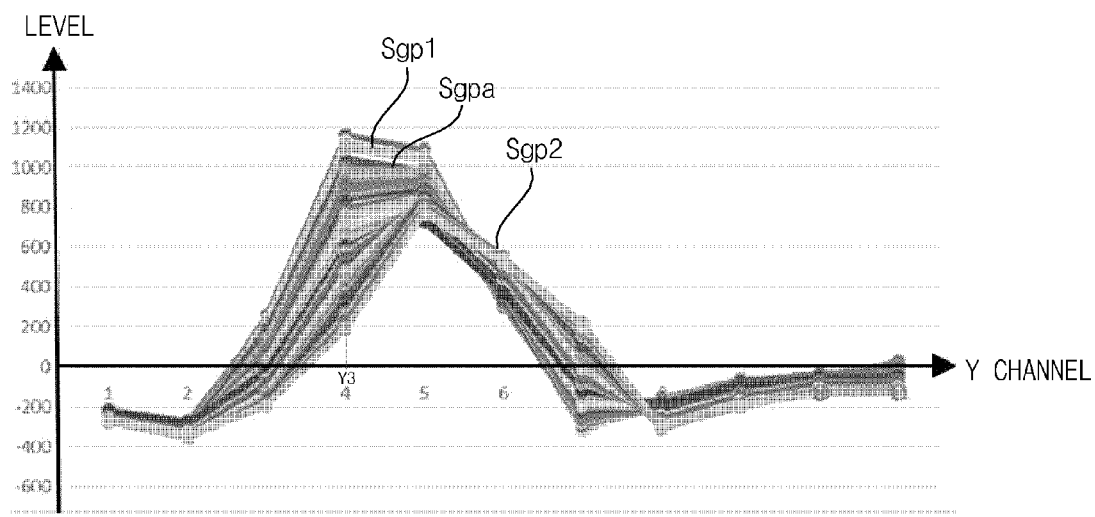

FIG. 20B shows a plurality of sensing signals Sgp1, Sgpa, and Sgp2 when the electronic pen 400 moves from the point P1 to the point P2.

Here, Sgp1 may correspond to a sensing signal in the case in which the electronic pen 400 is located at the point P1, Sgpa may correspond to a sensing signal in the case in which the electronic pen 400 is located at the point Pa, and Sgp2 may correspond to a sensing signal in the case in which the electronic pen 400 is located at the point P2.

Figure 20C:
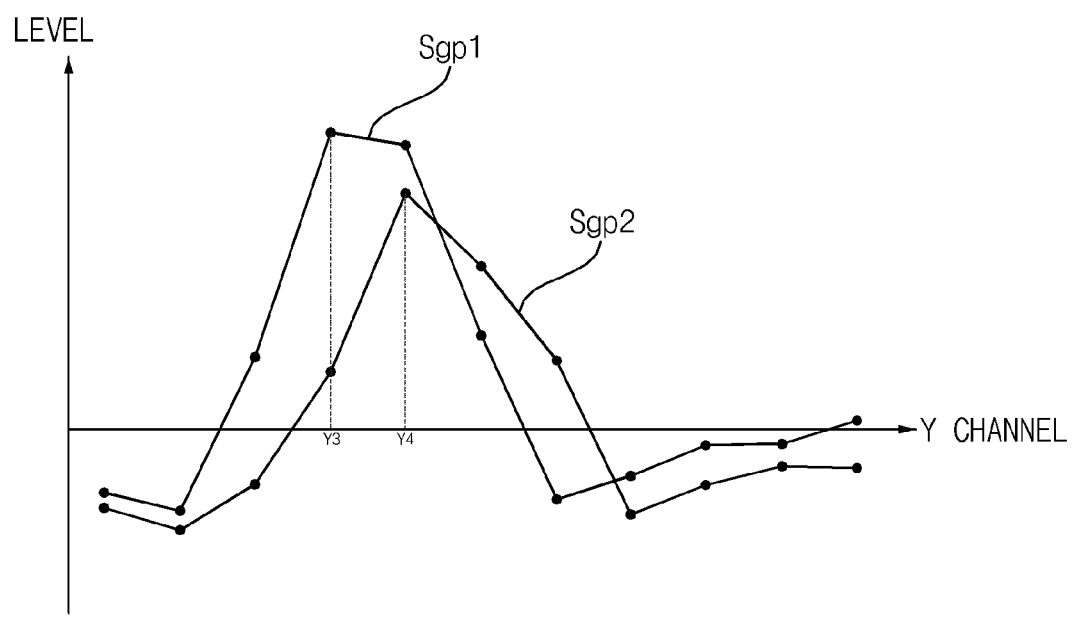

FIG. 20C shows a sensing signal Sgp1 in the case in which the electronic pen 400 is located at the point P1 and a sensing signal Sgp2 in the case in which the electronic pen 400 is located at the point P2.

Meanwhile, the sensing signal Sgp2 in the case in which the electronic pen 400 is located at the point P2 may not be accurately sensed due to the first area Ara, in which the heterogeneous sensor 149 is disposed.

Figure 20D:
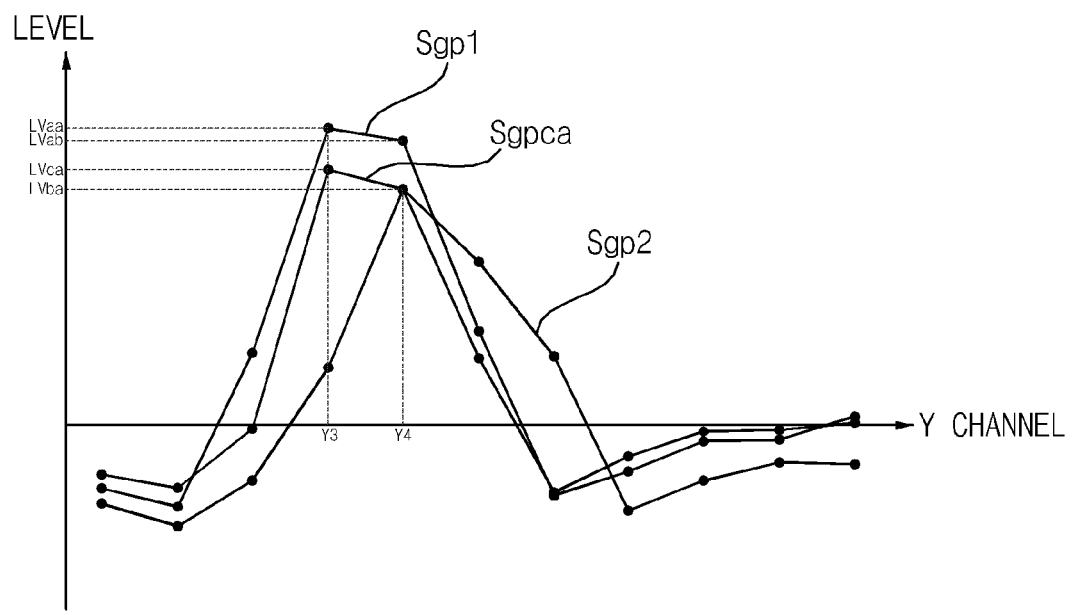

Referring to FIGS. 20C and 20D, the level at a channel Y3 of the sensing signal Sgp1 is the highest, and the level at a channel Y4 of the sensing signal Sgp2 is the highest.

Since the electronic pen 400 moves downwards from a position corresponding to the channel Y3, however, the level at a channel Y3 of the sensing signal Sgp2 must be the highest.

This may be an error generated because recesses are formed in the channel Y3, the channel Y4, and the channel Y5 around the first area Ara, in which heterogeneous sensor 149 is disposed.

Alternatively, this may be an error generated in the case in which the electronic pen 400 is located in an edge area, rather than a central area of the channel sensor.

Consequently, it is preferable for the processor 1270 to compensate for the sensing signal in the case in which the electronic pen 400 is located near the first area Ara, in which heterogeneous sensor 149 is disposed, as well as in the case in which the electronic pen 400 is located in the first area Ara, in which heterogeneous sensor 149 is disposed.

The processor 1270 may generate a compensation signal Sgpca of FIG. 20D using sequentially sensed sensing signals.

The compensation signal Sgpca in the figure is a compensation signal in the case in which the electronic pen 400 is located at the point P2. The level at a channel Y3, rather than a channel Y4, of the compensation signal Sgpca is the highest.

Consequently, the processor 1270 may calculate accurate coordinate information, particularly y-axis information, based on the compensation signal Sgpca.

Figure 20E:
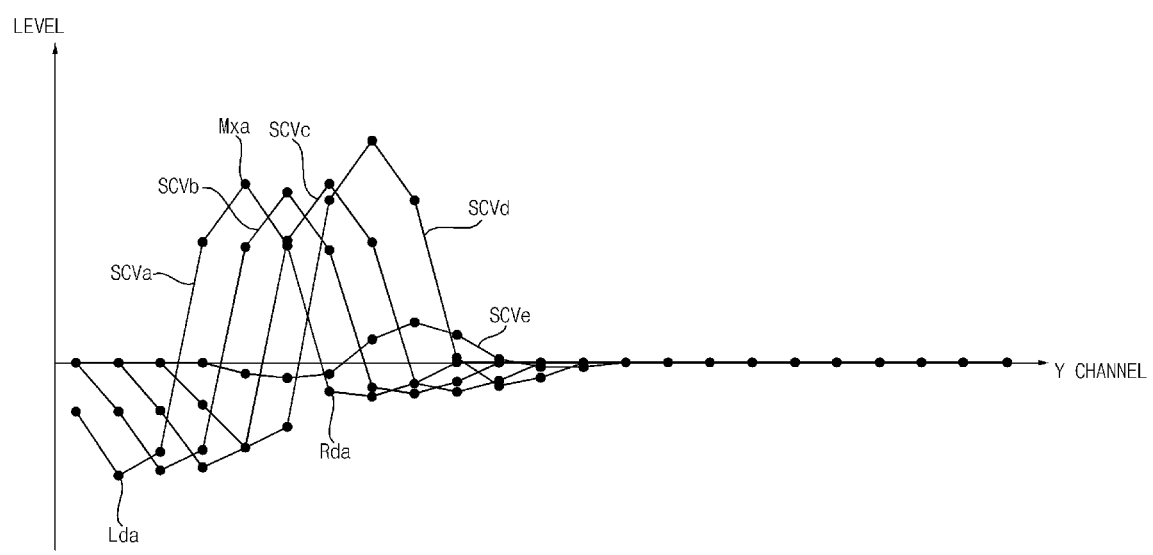

FIG. 20E shows a plurality of sensing signals SCVa to SCVe.

Thereamong, first to third sensing signals SCVa to SCVc may be sensing signals sensed in the central area of the channel sensor, and may be normal sensing signals.

Each of the first to third sensing signals SCVa to SCVc, which are normal sensing signals, may have the maximum level point Max, the left minimum level (left dip) LDa, and the right minimum level (right dip) RDa.

The maximum level point Max and the left minimum level (left dip) LDa or the right minimum level (right dip) RDa may be spaced apart from each other by a predetermined distance.

The processor 1270 may compensate for the sensing signals using the distance between the maximum level point Max and the left minimum level (left dip) LDa or the right minimum level (right dip) RDa.

Fourth and fifth sensing signals SCVd and SCVe may be sensing signals sensed in the edge area of the channel sensor, and may be abnormal sensing signals.

Each of the fourth and fifth sensing signals SCVd and SCVe, which are abnormal sensing signals, may have a low level or may have an irregular distance between the maximum level point Max and the left minimum level.

Consequently, the processor 1270 may compensate for the fourth and fifth sensing signals SCVd and SCVe using an existing sensing signal.

As an example, the processor 1270 may compensate for sensing signals sensed by at least some of a plurality of the channel sensors using the average of levels of a plurality of sensing signals. Consequently, it is possible to calculate coordinate information of the electronic pen 400 even in the heterogeneous sensor area, in which the electronic pen sensor 148 is not disposed.

As another example, the processor 1270 may perform setting such that sensing signals nearer the first area Ara have higher weights and may then compensate for sensing signals sensed by at least some of a plurality of channel sensors X0 to Xm. Consequently, it is possible to calculate coordinate information of the electronic pen 400 even in the heterogeneous sensor area, in which the electronic pen sensor 148 is not disposed.

As a further example, the processor 1270 may compensate for the maximum level of each of the fourth and fifth sensing signals SCVd and SCVe using the ratio of the maximum level point Max to the left minimum level (left dip) LDa or the right minimum level (right dip) RDa in the existing sensing signal.

Alternatively, the processor 1270 may compensate for the left minimum level (left dip) and the right minimum level (right dip) of each of the fourth and fifth sensing signals SCVd and SCVe using the ratio of the maximum level point Max to the left minimum level (left dip) LDa or the right minimum level (right dip) RDa in the existing sensing signal.

Meanwhile, the processor 1270 may not perform signal compensation in the case in which there is no existing sensing signal.

For example, in the case in which the first position of the electronic pen sensor 148 is the first area Ara, in which the heterogeneous sensor 149 is disposed, as shown in FIG. 12, i.e. in the case in which there is no existing sensing signal, the processor 1270 may not perform signal compensation.

Consequently, it is preferable that a guide message 2010 for guiding movement of the electronic pen 400 be output.

Figure 21:
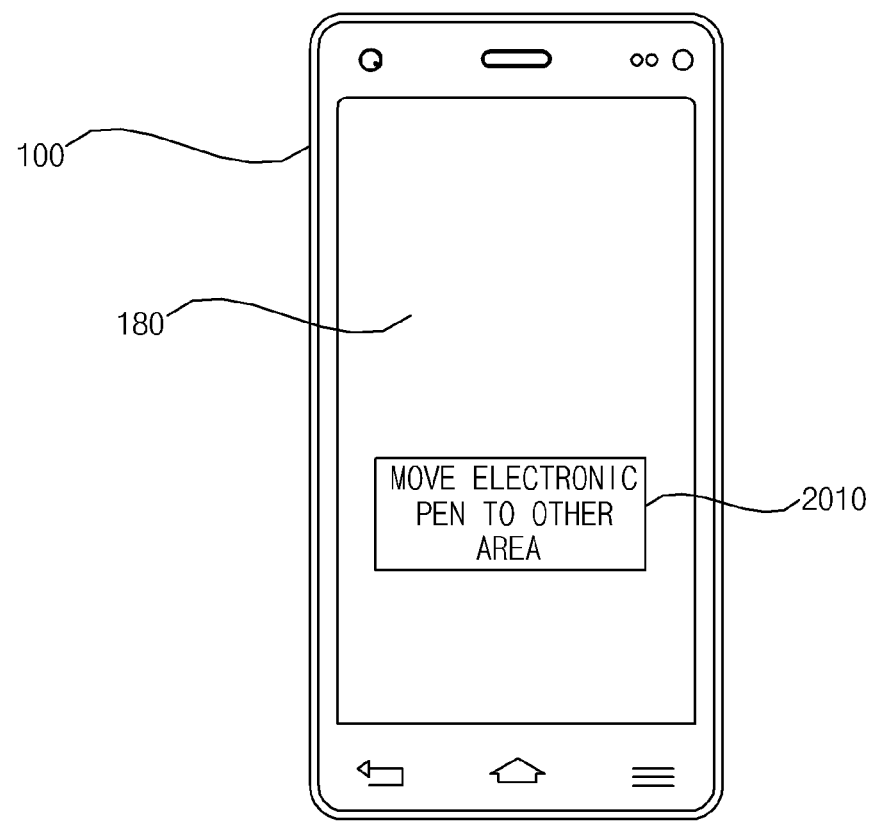

FIG. 21 shows the guide message 2010 output on the display 180 of the electronic device 100. Alternatively, a sound may be output.

Figure 22:
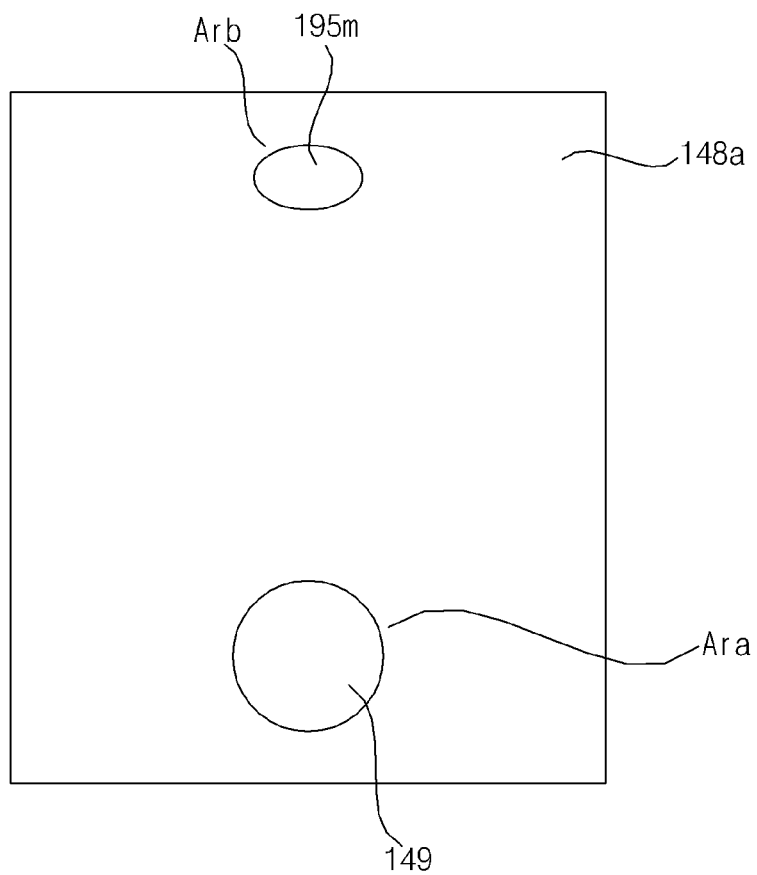
Figure 23:
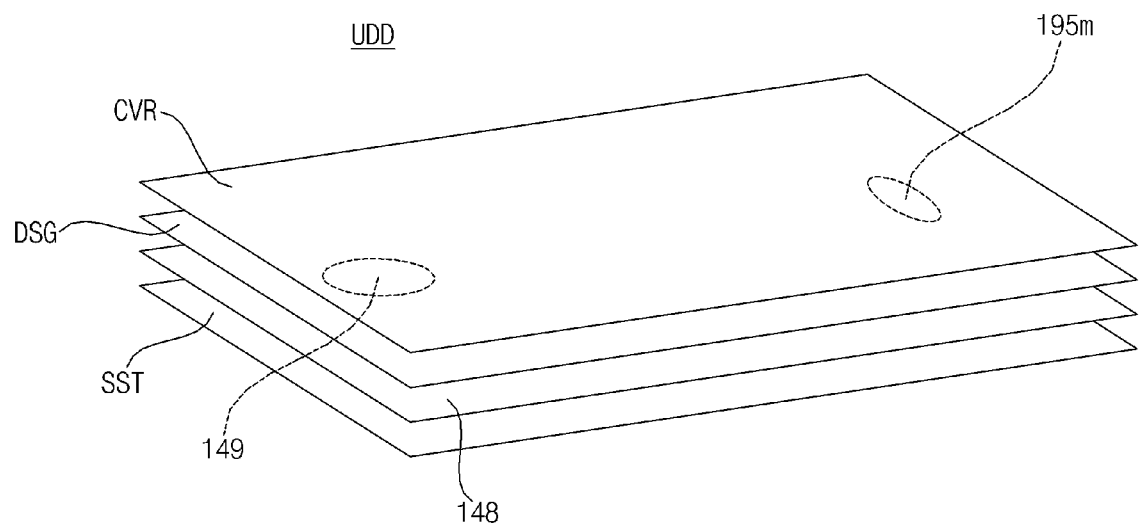

FIG. 22 is a view showing an electronic pen sensing apparatus according to another embodiment of the present disclosure, and FIG. 23 is a perspective view of the electronic pen sensing apparatus according to the other embodiment of the present disclosure.

Referring to the figures, the electronic pen sensing apparatus UDD according to the other embodiment of the present disclosure includes an electronic pen sensor 148a disposed at the upper part or the lower part of a display DSG, a heterogeneous sensor 149 disposed at the lower part of the display DSG, and a second heterogeneous sensor 195m disposed at the lower part of the display DSG.

In the figures, the electronic pen sensor 148a is shown as being disposed at the lower part of the display DSG.

FIG. 23 shows that a cover glass CVR is disposed at the upper part of the display DSG, the electronic pen sensor 148a, the heterogeneous sensor 149, and the second heterogeneous sensor 195m are disposed at the lower part of the display DSG, and a shielding sheet SST is disposed at the lower part of the electronic pen sensor 148a and the heterogeneous sensor 149.

Meanwhile, the heterogeneous sensor 149 may be a fingerprint sensor, and the second heterogeneous sensor 195m may be a camera. However, the present disclosure is not limited thereto, and various modifications are possible.

Meanwhile, in order to operate the electronic pen sensor 148a and the heterogeneous sensor 149, it is preferable for the electronic pen sensor 148a not to be disposed in a first area Ara corresponding to the heterogeneous sensor 149 and a third area Arb corresponding to the second heterogeneous sensor 195m.

For example, it is preferable for the electronic pen sensor 148 to be disposed in an area other than the first area Ara and the third area Arb. Also, it is preferable for the heterogeneous sensor 149 to be disposed in the first area Ara and for the second heterogeneous sensor 195m to be disposed in the third area Arb. As a result, the electronic pen sensor and at least one heterogeneous sensor may be embodied together.

Figure 24A:
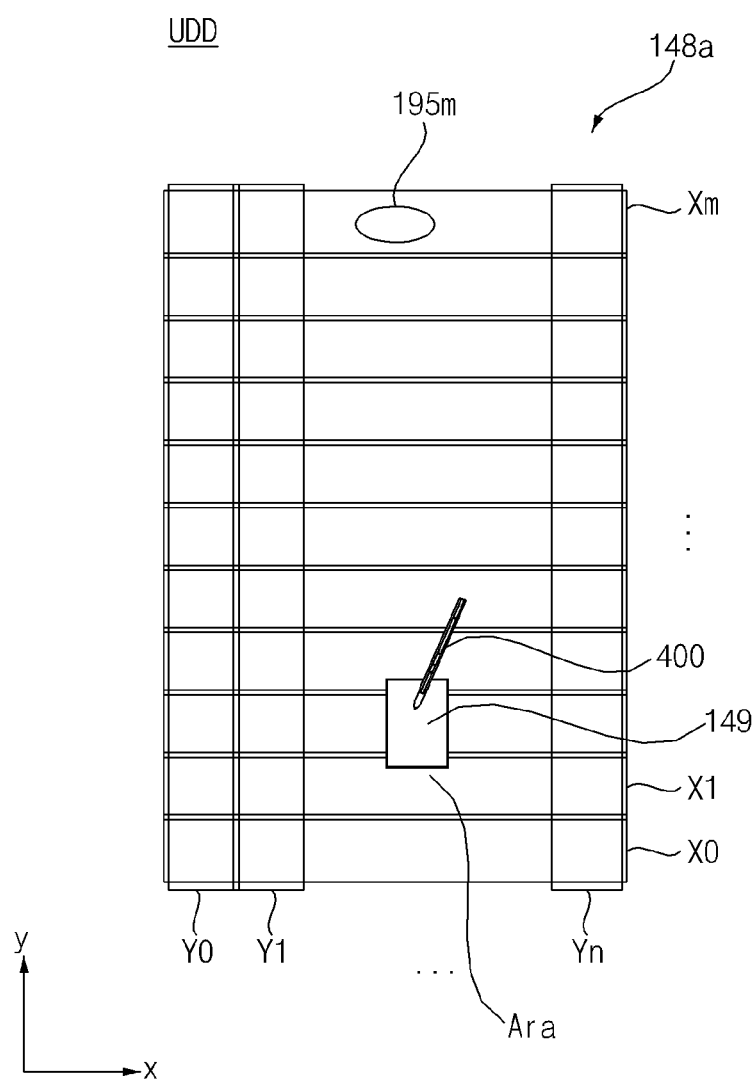

FIG. 24A is a view showing an example of the structure of the electronic pen sensor in the electronic pen sensing apparatus according to the other embodiment of the present disclosure.

Referring to the figure, the electronic pen sensor 148a in the electronic pen sensing apparatus UDD may include a plurality of first channel sensors X0 to Xm disposed to extend in the first direction (the x-axis direction) and a plurality of second channel sensors Y0 to Yn disposed to extend in the second direction (the y-axis direction), which intersects the first direction (the x-axis direction).

The first channel sensors X0 to Xm and the second channel sensors Y0 to Yn are not disposed in the first area Ara corresponding to the heterogeneous sensor 149, and the electronic pen sensor 148a is not disposed in the third area Arb corresponding to the second heterogeneous sensor 195m. As a result, the electronic pen sensor 148a, the heterogeneous sensor 149, and the second heterogeneous sensor 195m may be embodied together.

Figure 24B:
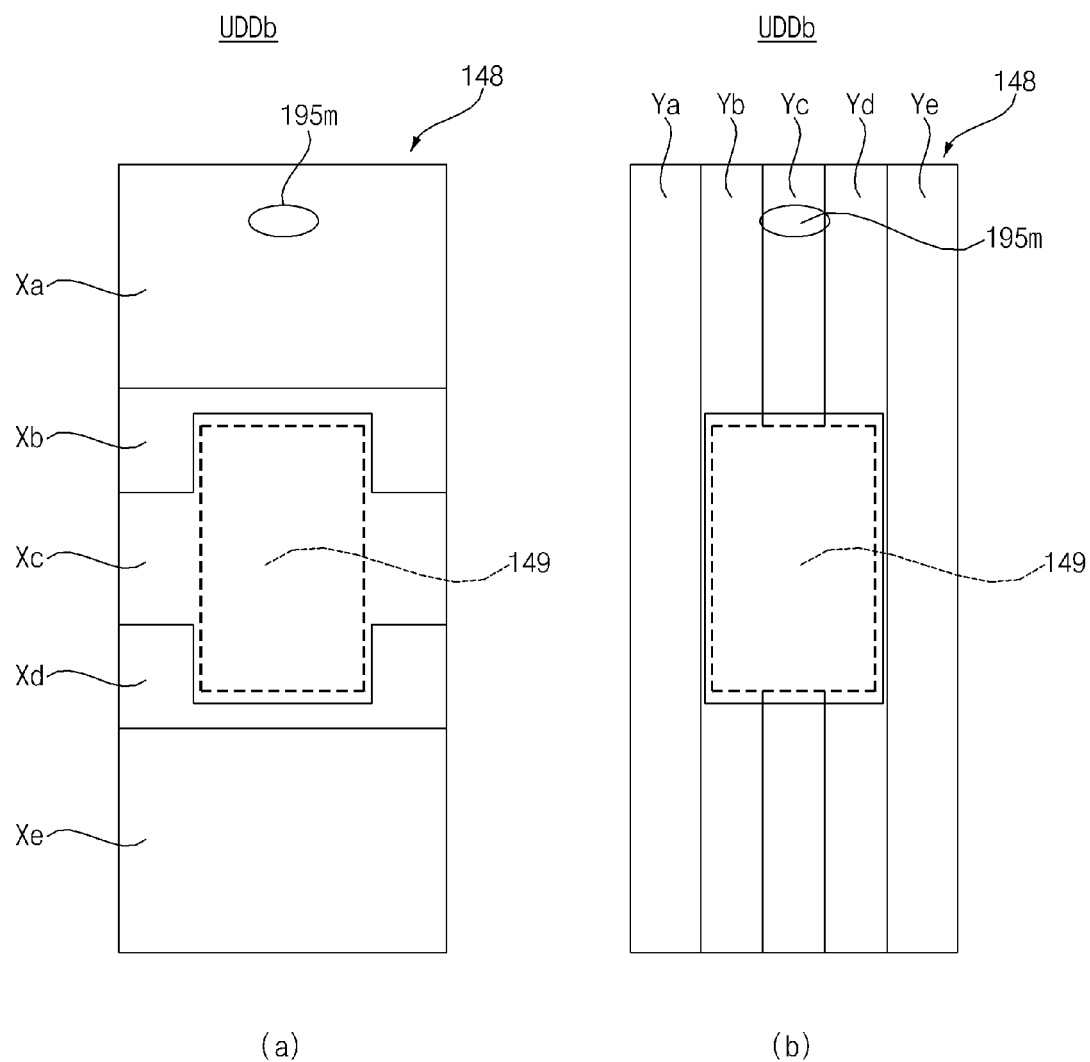

FIG. 24B is a view showing another example of the structure of the electronic pen sensor in the electronic pen sensing apparatus according to the other embodiment of the present disclosure.

Referring to the figure, an electronic pen sensor 148 in an electronic pen sensing apparatus UDDb may include a plurality of first channel sensors Xa to Xe disposed to extend in the first direction (the x-axis direction) and a plurality of second channel sensors Ya to Ye disposed to extend in the second direction (the y-axis direction), which intersects the first direction (the x-axis direction).

Among the plurality of first channel sensors Xa to Xe, Xa and Xe may be symmetric with each other, and Xb and Xd may be symmetric with each other while having recesses formed therein.

Among the plurality of second channel sensors Ya to Ye, Ya and Ye may be symmetric with each other, and Yb and Yd may be symmetric with each other while having recesses formed therein.

Figure 25:
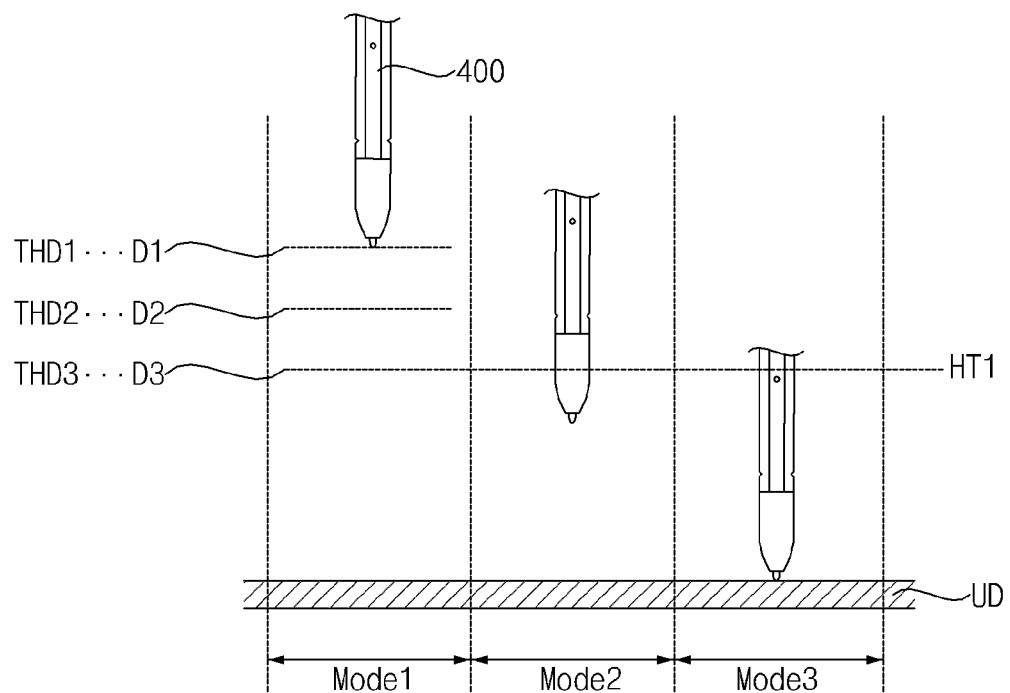

FIG. 25 is a view showing mode change based on the distance between the electronic pen sensing apparatus UD and the electronic pen 400.

Referring to the figure, in the case in which the electronic pen 400 is located at a position farther than a first distance D1, the processor 1270 may be configured to output a driving signal having a first driving frequency F1. In the case in which the electronic pen 400 is located between the first distance D1 and a second distance D2, the processor 1270 may be configured to output a driving signal having a second driving frequency F2 higher than the first driving frequency F1. Consequently, it is possible to sense the electronic pen 400 while efficiently consuming power.

Meanwhile, in the case in which the electronic pen 400 is located within a third distance D3 nearer than the second distance D2, the processor 1270 may be configured to output a driving signal having a third driving frequency F3 higher than the second driving frequency F2. Consequently, it is possible to accurately calculate coordinate information of the electronic pen 400.

Meanwhile, in the case in which the electronic pen 400 is located between the second distance D2 and the third distance D3, the processor 1270 may perform first direction (x-axis direction) sensing and second direction (y-axis direction) sensing according to first direction (x-axis direction) driving. In the case in which the electronic pen 400 is located within the third distance D3, the processor 1270 may perform first direction (x-axis direction) sensing and second direction (y-axis direction) sensing according to second direction (y-axis direction) driving. Consequently, it is possible to sense the electronic pen 400 and to accurately calculate coordinate information of the electronic pen 400.

Meanwhile, in the case in which the distance from the electronic pen 400 is equal to or greater than the third distance D3, the processor 1270 may be configured to execute a first mode. Here, the first mode may be a discovery mode.

In the case in which the distance from the electronic pen 400 is within the third distance D3 and does not contact the display 180 or the electronic pen sensing apparatus UD, the processor 1270 may be configured to execute a second mode. Here, the second mode may be a hover mode.

In the case in which the distance from the electronic pen 400 is within the third distance D3 and contacts the display 180 or the electronic pen sensing apparatus UD, the processor 1270 may be configured to execute a third mode. Here, the second mode may be a touch mode.

In the third mode, the processor 1270 may be configured to output a driving signal having the third driving frequency F3 higher than the second driving frequency F2.

In the third mode, the processor 1270 may calculate coordinate information, tilt information, and pen pressure information.

Meanwhile, in the second mode, the processor 1270 may calculate hover distance information and coordinate information.

Meanwhile, in the first mode, the processor 1270 may calculate distance information.

Meanwhile, in the first mode, Y-channel driving having a smaller number of channels may be performed. In the second and third modes, X-channel driving having a larger number of channels may be performed.

Figure 26:
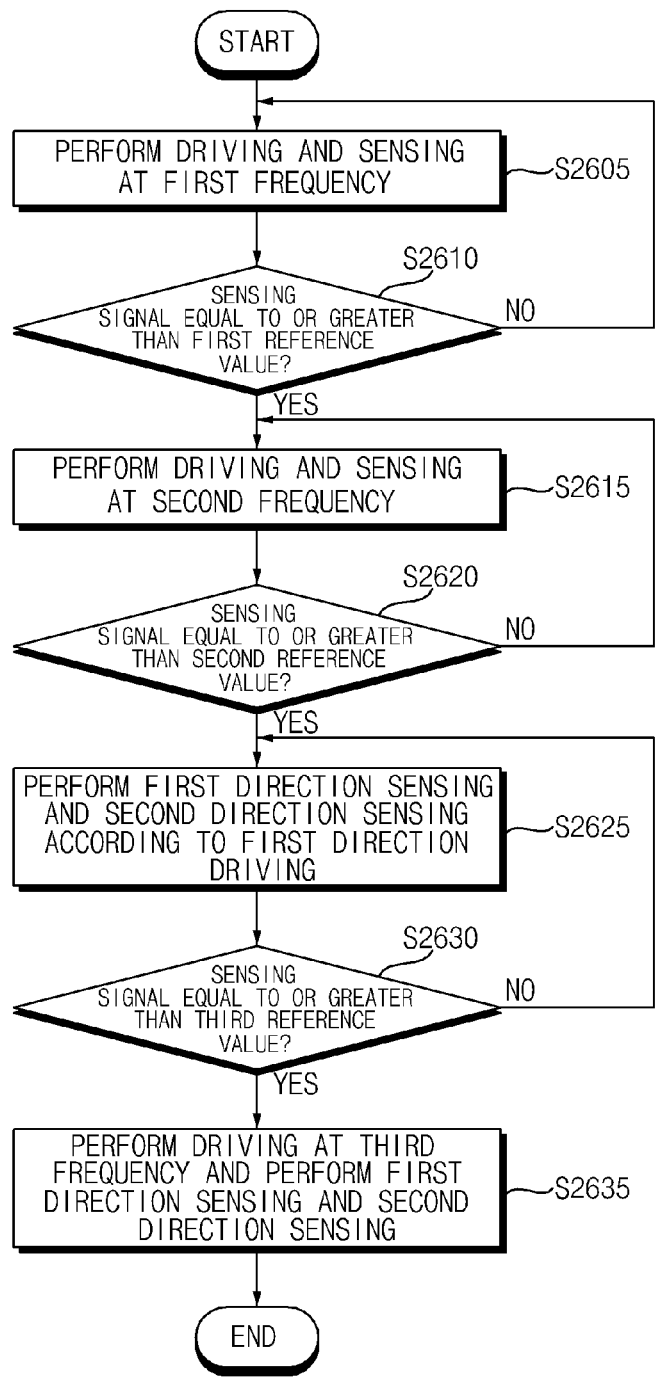
Figure 27:
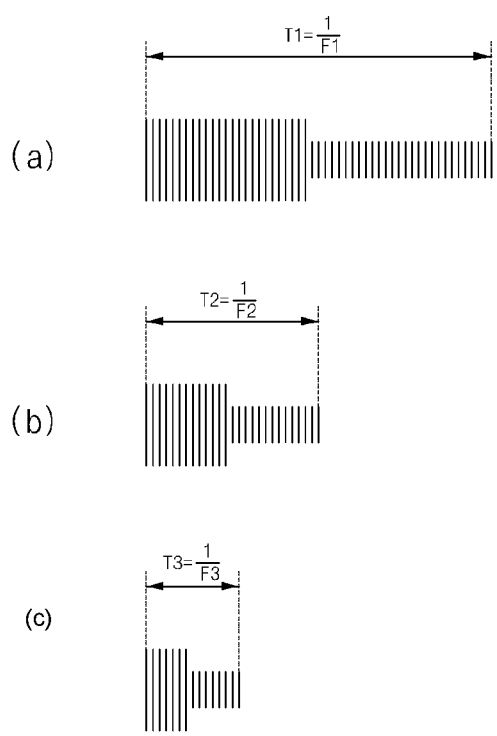

FIG. 26 is a flowchart showing another example of the operation method of the electronic pen sensing apparatus according to the embodiment of the present disclosure, and FIG. 27 is a reference view illustrating the operation method of FIG. 26.

Referring to the figure, the processor 1270 performs driving and sensing at a first driving frequency F1 (S2605).

Specifically, as shown in FIG. 27(a), the processor 1270 performs driving and sensing at a first driving frequency F1 corresponding to a first driving period T1.

Upon receiving a sensing signal equal to or higher than a first reference value THD1 during operation at the first driving frequency F1 (S2610), the processor 1270 performs driving and sensing at a second driving frequency F2 higher than the first driving frequency F1 (S2615).

Specifically, in the case in which the level of a sensing signal sensed by the electronic pen sensor 148 during operation at the first driving frequency F1 is between the first reference value THD1 and a second reference value THD2, the processor 1270 may be configured to output a driving signal having a second driving frequency F2 higher than the first driving frequency F1.

That is, as shown in FIG. 27(b), the processor 1270 performs driving and sensing at a second driving frequency F2 corresponding to a second driving period T2 shorter than the first driving period T1.

Subsequently, upon receiving a sensing signal equal to or higher than the second reference value THD2 during operation at the second driving frequency F2 (S2620), the processor 1270 performs first direction sensing and second direction sensing according to first direction driving (S2625).

Specifically, in the case in which the level of a sensing signal sensed by the electronic pen sensor 148 during operation at the second driving frequency F2 is between the second reference value THD2 and a third reference value THD3, the processor 1270 may perform first direction sensing and second direction sensing according to first direction driving.

For example, the processor 1270 may perform Y-channel sensing and X-channel sensing according to Y-channel driving.

Subsequently, upon receiving a sensing signal equal to or higher than the third reference value THD3 during operation at the second driving frequency F2 (S2630), the processor 1270 performs driving and sensing at a third driving frequency F3 higher than the second driving frequency F2 (S2635).

Specifically, in the case in which the level of a sensing signal sensed by the electronic pen sensor 148 during operation at the second driving frequency F2 is equal to or greater than the third reference value THD3 higher than the second reference value THD2, the processor 1270 may perform control such that a driving signal having the third driving frequency F3 higher than the second driving frequency F2 is output.

That is, as shown in FIG. 27(c), the processor 1270 performs driving and sensing at a third driving frequency F3 corresponding to a third driving period T3 shorter than the second driving period T2.

In addition, the processor 1270 may perform Y-channel sensing and X-channel sensing according to X-channel driving. Consequently, it is possible to accurately calculate coordinate information of the electronic pen 400.

As is apparent from the above description, an electronic pen sensing apparatus according to an embodiment of the present disclosure and an electronic device including the same include an electronic pen sensor disposed at the upper part or the lower part of a display, a heterogeneous sensor disposed at the lower part of the display, a processor electrically connected to the electronic pen sensor, the processor being configured to output a driving signal to the electronic pen sensor, to calculate coordinate information of the electronic pen based on a sensing signal sensed by the electronic pen sensor, wherein the electronic pen sensor is not disposed in a first area corresponding to the heterogeneous sensor, and the processor is configured to calculate first coordinate information of the electronic pen based on a first sensing signal sensed by the electronic pen sensor in the case in which the electronic pen is located in a second area and to calculate second coordinate information of the electronic pen based on a compensation signal obtained by compensating for the first sensing signal in the case in which the electronic pen moves from the second area to the first area or the vicinity of the first area. Consequently, it is possible to calculate coordinate information of the electronic pen even in a heterogeneous sensor area in which no electronic pen sensor is disposed.

The electronic pen sensor may include a plurality of first channel sensors disposed to extend in a first direction and a plurality of second channel sensors disposed to extend in a second direction intersecting the first direction, and the first channel sensors and the second channel sensors may not be disposed in the first area corresponding to the heterogeneous sensor. Consequently, it is possible to embody the electronic pen sensor and the heterogeneous sensor together.

In the case in which the electronic pen moves from the second area to the first area or the vicinity of the first area, the processor may compensate for sensing signals sensed by at least some of the plurality of first channel sensors or at least some of the plurality of second channel sensors, and may calculate second coordinate information of the electronic pen based on the compensation signals. Consequently, it is possible to calculate coordinate information of the electronic pen even in a heterogeneous sensor area in which no electronic pen sensor is disposed.

The processor may compensate for the sensing signals sensed by at least some of the plurality of first channel sensors using the average of levels of a plurality of sensing signals. Consequently, it is possible to calculate coordinate information of the electronic pen even in a heterogeneous sensor area in which no electronic pen sensor is disposed.

The processor may perform setting such that sensing signals nearer the first area have higher weights and may then compensate for the sensing signals sensed by the at least some of the plurality of first channel sensors. Consequently, it is possible to calculate coordinate information of the electronic pen even in a heterogeneous sensor area in which no electronic pen sensor is disposed.

The plurality of first channel sensors may be disposed to overlap each other, and the plurality of second channel sensors may be disposed to overlap each other. Consequently, it is possible to sense sensing signals through the plurality of first channel sensors or the plurality of second channel sensors.

The plurality of first channel sensors may be symmetric with respect to the first area. Consequently, it is possible to perform signal compensation using sensing signals sensed by the plurality of first channel sensors.

The plurality of second channel sensors may be symmetric with respect to the first area. Consequently, it is possible to perform signal compensation using sensing signals sensed by the plurality of second channel sensors.

The processor may be configured to output a driving signal having a first driving frequency in the case in which the electronic pen is located at a position farther than a first distance and to output a driving signal having a second driving frequency higher than the first driving frequency in the case in which the electronic pen is located between the first distance and a second distance. Consequently, it is possible to sense the electronic pen while efficiently consuming power.

The processor may be configured to output a driving signal having a third driving frequency higher than the second driving frequency in the case in which the electronic pen is located within a third distance nearer than the second distance. Consequently, it is possible to accurately calculate coordinate information of the electronic pen.

The processor may be configured to perform first direction sensing and second direction sensing according to first direction driving in the case in which the electronic pen is located between the second distance and the third distance and to perform first direction sensing and second direction sensing according to second direction driving in the case in which the electronic pen is located within the third distance. Consequently, it is possible to sense the electronic pen and to accurately calculate coordinate information of the electronic pen.

The processor may be configured to output a driving signal having a first driving frequency and to output a driving signal having a second driving frequency higher than the first driving frequency in the case in which the level of the sensing signal sensed by the electronic pen sensor is between a first reference value and a second reference value. Consequently, it is possible to sense the electronic pen while efficiently consuming power.

The processor may be configured to output a driving signal having a third driving frequency higher than the second driving frequency in the case in which the level of the sensing signal sensed by the electronic pen sensor while outputting the driving signal having the second driving frequency is equal to or greater than a third reference value higher than the second reference value. Consequently, it is possible to accurately calculate coordinate information of the electronic pen.

The processor may be configured to perform first direction sensing and second direction sensing according to first direction driving in the case in which the level of the sensing signal sensed by the electronic pen sensor is between the second reference value and the third reference value and to perform first direction sensing and second direction sensing according to second direction driving in the case in which the level of the sensing signal sensed by the electronic pen sensor is equal to or greater than the third reference value. Consequently, it is possible to sense the electronic pen and to accurately calculate coordinate information of the electronic pen.

A through hole may be formed in a portion of an area in which the electronic pen sensor is disposed, and the heterogeneous sensor may be disposed in the through hole. Consequently, it is possible to dispose the heterogeneous sensor and the electronic pen sensor on the same layer.

The electronic pen sensor may be disposed at the lower part of the display, a shielding sheet may be disposed at the lower part of the electronic pen sensor, and the heterogeneous sensor may be formed to protrude in a direction toward the shielding sheet. Consequently, it is possible to dispose the heterogeneous sensor to protrude toward the shielding sheet.

The electronic pen sensor may be disposed at the lower part of the display, a shielding sheet may be disposed at the lower part of the electronic pen sensor, and the heterogeneous sensor may be formed to protrude in a direction toward the display. Consequently, it is possible to dispose the heterogeneous sensor to protrude toward the display.

The electronic pen sensing apparatus according to the embodiment of the present disclosure and the electronic device including the same may further include a second heterogeneous sensor disposed at the lower part of the display, wherein the electronic pen sensor may not be disposed in a third area corresponding to the second heterogeneous sensor. Consequently, it is possible to embody the electronic pen sensor, the heterogeneous sensor, and the second heterogeneous sensor together.

The processor may be configured to calculate third coordinate information of the electronic pen based on a second sensing signal sensed by the electronic pen sensor in the case in which the electronic pen is located in a fourth area and to calculate fourth coordinate information of the electronic pen based on a compensation signal obtained by compensating for the second sensing signal in the case in which the electronic pen moves from the fourth area to the third area or the vicinity of the third area. Consequently, it is possible to calculate coordinate information of the electronic pen even in a second heterogeneous sensor area in which no electronic pen sensor is disposed.

An electronic pen sensing apparatus according to another embodiment of the present disclosure and an electronic device including the same include an electronic pen sensor disposed at the upper part or the lower part of a display, a heterogeneous sensor disposed at the lower part of the display, a second heterogeneous sensor disposed at the lower part of the display, a processor electrically connected to the electronic pen sensor, the processor being configured to output a driving signal to the electronic pen sensor, to calculate coordinate information of the electronic pen based on a sensing signal sensed by the electronic pen sensor, wherein the electronic pen sensor is not disposed in a first area corresponding to the heterogeneous sensor, and the electronic pen sensor is not disposed in a third area corresponding to the second heterogeneous sensor. Consequently, it is possible to embody the electronic pen sensor, the heterogeneous sensor, and the second heterogeneous sensor together.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An electronic pen sensing apparatus comprising:
   an electronic pen sensor disposed at an upper part or a lower part of a display;
   a heterogeneous sensor disposed at the lower part of the display;
   a processor electrically connected to the electronic pen sensor, the processor being configured to cause an output of a driving signal to the electronic pen sensor, and to determine coordinate information of the electronic pen based on a sensing signal sensed by the electronic pen sensor,
   wherein the electronic pen sensor is not disposed in a first area corresponding to the heterogeneous sensor, and
   wherein the processor is further configured to:
   determine first coordinate information of the electronic pen based on a first sensing signal sensed by the electronic pen sensor and the electronic pen being located in a second area;
   determine second coordinate information of the electronic pen based on a compensation signal obtained by compensating for the first sensing signal and the electronic pen moving from the second area to the first area or a vicinity of the first area; and
   cause the output of the driving signal having a first driving frequency or a second driving frequency higher than the first driving frequency based on a distance from the electronic pen or a level of the sensing signal sensed by the electronic pen sensor.

2. The electronic pen sensing apparatus of claim 1, wherein the electronic pen sensor comprises:
   a plurality of first channel sensors disposed to extend in a first direction; and
   a plurality of second channel sensors disposed to extend in a second direction intersecting the first direction, and
   the first channel sensors and the second channel sensors are not disposed in the first area corresponding to the heterogeneous sensor.

3. The electronic pen sensing apparatus of claim 2, wherein, based on the electronic pen moving from the second area to the first area or the vicinity of the first area, the processor is further configured to: compensate for sensing signals sensed by at least some of the plurality of first channel sensors or at least some of the plurality of second channel sensors, and calculate second coordinate information of the electronic pen based on the compensation signals.

4. The electronic pen sensing apparatus of claim 3, wherein the processor is further configured to compensate for the sensing signals sensed by at least some of the plurality of first channel sensors using an average of levels of a plurality of sensing signals.

5. The electronic pen sensing apparatus of claim 3, wherein the processor is further configured to perform a setting such that sensing signals nearer the first area have higher weights and then to compensate for the sensing signals sensed by the at least some of the plurality of first channel sensors.

6. The electronic pen sensing apparatus of claim 2, wherein the plurality of first channel sensors is symmetric with respect to the first area.

7. The electronic pen sensing apparatus of claim 2, wherein the plurality of second channel sensors is symmetric with respect to the first area.

8. The electronic pen sensing apparatus of claim 1, wherein the processor is further configured:
   to output the driving signal having the first driving frequency in a case in which the electronic pen is located at a position farther than a first distance; and
   to output a driving signal having the second driving frequency higher than the first driving frequency in a case in which the electronic pen is located between the first distance and a second distance.

9. The electronic pen sensing apparatus of claim 8, wherein the processor is further configured to output a driving signal having a third driving frequency higher than the second driving frequency in a case in which the electronic pen is located within a third distance nearer than the second distance.

10. The electronic pen sensing apparatus of claim 9, wherein the processor is further configured:
    to perform first direction sensing and second direction sensing according to first direction driving in a case in which the electronic pen is located between the second distance and the third distance; and
    to perform first direction sensing and second direction sensing according to second direction driving in a case in which the electronic pen is located within the third distance.

11. The electronic pen sensing apparatus of claim 1, wherein the processor is further configured:
    to perform control such that the driving signal having the first driving frequency is output; and
    to output a driving signal having the second driving frequency higher than the first driving frequency in a case in which the level of the sensing signal sensed by the electronic pen sensor is between a first reference value and a second reference value.

12. The electronic pen sensing apparatus of claim 11, wherein the processor is further configured to output a driving signal having a third driving frequency higher than the second driving frequency in a case in which the level of the sensing signal sensed by the electronic pen sensor while outputting the driving signal having the second driving frequency is equal to or greater than a third reference value higher than the second reference value.

13. The electronic pen sensing apparatus of claim 12, wherein the processor is further configured:
    to perform first direction sensing and second direction sensing according to first direction driving in a case in which the level of the sensing signal sensed by the electronic pen sensor is between the second reference value and the third reference value; and
    to perform first direction sensing and second direction sensing according to second direction driving in a case in which the level of the sensing signal sensed by the electronic pen sensor is equal to or greater than the third reference value.

14. The electronic pen sensing apparatus of claim 1, wherein a through hole is formed in a portion of an area in which the electronic pen sensor is disposed, and
    wherein the heterogeneous sensor is disposed in the through hole.

15. The electronic pen sensing apparatus of claim 14, wherein the electronic pen sensor is disposed at the lower part of the display,
    wherein a shielding sheet is disposed at a lower part of the electronic pen sensor, and
    wherein the heterogeneous sensor is formed to protrude in a direction toward the shielding sheet.

16. The electronic pen sensing apparatus of claim 14, wherein the electronic pen sensor is disposed at the lower part of the display, wherein a shielding sheet is disposed at a lower part of the electronic pen sensor, and wherein the heterogeneous sensor is formed to protrude in a direction toward the display.

17. The electronic pen sensing apparatus of claim 1, further comprising:
a second heterogeneous sensor disposed at the lower part of the display,
wherein the electronic pen sensor is not disposed in a third area corresponding to the second heterogeneous sensor, wherein the processor is further configured to:
determine third coordinate information of the electronic pen based on a second sensing signal sensed by the electronic pen sensor in a case in which the electronic pen is located in a fourth area; and
determine fourth coordinate information of the electronic pen based on a compensation signal obtained by compensating for the second sensing signal in a case in which the electronic pen moves from the fourth area to the third area or a vicinity of the third area.

18. An electronic device comprising a electronic pen sensing apparatus,
wherein the electronic pen sensing apparatus comprising:
an electronic pen sensor disposed at an upper part or a lower part of a display;
a heterogeneous sensor disposed at the lower part of the display;
a processor electrically connected to the electronic pen sensor, the processor is configured to cause an output of a driving signal to the electronic pen sensor, and to determine coordinate information of the electronic pen based on a sensing signal sensed by the electronic pen sensor,
wherein the electronic pen sensor is not disposed in a first area corresponding to the heterogeneous sensor, and
wherein the processor is configured to:
determine first coordinate information of the electronic pen based on a first sensing signal sensed by the electronic pen sensor in a case in which the electronic pen is located in a second area;
determine second coordinate information of the electronic pen based on a compensation signal obtained by compensating for the first sensing signal in a case in which the electronic pen moves from the second area to the first area or a vicinity of the first area; and
cause an output of a driving signal having a first driving frequency or a second driving frequency higher than the first driving frequency based on a distance from the electronic pen or a level of the sensing signal sensed by the electronic pen sensor.

19. An electronic pen sensing apparatus comprising:
an electronic pen sensor disposed at an upper part or a lower part of a display;
a heterogeneous sensor disposed at the lower part of the display;
a processor electrically connected to the electronic pen sensor, wherein the processor is configured to cause an output of a driving signal to the electronic pen sensor, and to determine coordinate information of the electronic pen based on a sensing signal sensed by the electronic pen sensor,
wherein the electronic pen sensor is not disposed in a first area corresponding to the heterogeneous sensor, and
wherein the electronic pen sensor comprises:
a plurality of first channel sensors disposed to extend in a first direction; and
a plurality of second channel sensors disposed to extend in a second direction intersecting the first direction, and
the first channel sensors and the second channel sensors are not disposed in the first area corresponding to the heterogeneous sensor,
wherein the plurality of first channel sensors is disposed to overlap each other, and
wherein the plurality of second channel sensors is disposed to overlap each other.

\* \* \* \* \*